US012409383B2

(12) United States Patent
Zhang

(10) Patent No.: US 12,409,383 B2
(45) Date of Patent: Sep. 9, 2025

(54) APPLICATION STARTUP AND ARCHIVING

(71) Applicant: Tencent Technology (Shenzhen) Company Limited, Guangdong (CN)

(72) Inventor: Yun Zhang, Shenzhen (CN)

(73) Assignee: TENCENT TECHNOLOGY (SHENZHEN) COMPANY LIMITED, Guangdong (CN)

(*) Notice: Subject to any disclaimer, the term of this patent is extended or adjusted under 35 U.S.C. 154(b) by 283 days.

(21) Appl. No.: 17/954,111

(22) Filed: Sep. 27, 2022

(65) Prior Publication Data
US 2023/0014732 A1   Jan. 19, 2023

Related U.S. Application Data

(63) Continuation of application No. PCT/CN2021/117770, filed on Sep. 10, 2021.

(30) Foreign Application Priority Data

Sep. 23, 2020   (CN) .......................... 202011011843.3

(51) Int. Cl.
*A63F 13/493*   (2014.01)
*A63F 13/48*   (2014.01)
(Continued)

(52) U.S. Cl.
CPC ............ *A63F 13/493* (2014.09); *A63F 13/48* (2014.09); *A63F 13/52* (2014.09); *A63F 2300/636* (2013.01); *H04L 67/131* (2022.05)

(58) Field of Classification Search
None
See application file for complete search history.

(56) References Cited

U.S. PATENT DOCUMENTS 8,613,673 B2* 12/2013 Perry .................... A63F 13/358
463/42
8,834,277 B2*  9/2014 Perry ..................... A63F 13/12
463/43

(Continued)

FOREIGN PATENT DOCUMENTS

CN   108066986 A   5/2018
CN   111603764 A   9/2020

(Continued)

OTHER PUBLICATIONS

International Search Report and Written Opinion issued Dec. 8, 2021 in International Application No. PCT/CN2021/117770 with English Translation (10 pages).

*Primary Examiner* — Seng H Lim
(74) *Attorney, Agent, or Firm* — ARENTFOX SCHIFF LLP

(57) ABSTRACT

A method for starting an application is provided. In the method, a video that includes game content of a game application is played back. A startup operation to start the game application is received from a user during the playback of the video. The game application is started in response to the startup operation. Further, the game content of the started game application that is determined to match the game content of the video when the startup operation is received from the user is displayed. The game content of the started game application is determined based on when the startup operation is received from the user during the playback of the video.

17 Claims, 12 Drawing Sheets

(a)

(b)

(51) Int. Cl.
*A63F 13/52* (2014.01)
*H04L 67/131* (2022.01)

(56) References Cited

U.S. PATENT DOCUMENTS

| | | | | |
|---|---|---|---|---|
| 8,840,476 B2* | 9/2014 | Perry | ............... | H04L 65/4025 463/42 |
| 8,926,435 B2* | 1/2015 | Perry | ............... | A63F 13/355 463/42 |
| 9,782,676 B2* | 10/2017 | Speck | ............... | A63F 13/30 |
| 10,625,156 B2* | 4/2020 | Sherwani | ............... | A63F 13/35 |
| 12,064,699 B2* | 8/2024 | Miura | ............... | A63F 13/533 |
| 2008/0207322 A1* | 8/2008 | Mizrahi | ............... | A63F 13/355 463/32 |
| 2009/0234938 A1* | 9/2009 | Amsterdam | ............... | H04N 21/44218 709/221 |
| 2012/0004039 A1* | 1/2012 | Perry | ............... | A63F 13/335 463/42 |
| 2012/0004040 A1* | 1/2012 | Pereira | ............... | A63F 13/355 463/42 |
| 2012/0004042 A1* | 1/2012 | Perry | ............... | A63F 13/355 463/42 |
| 2012/0005316 A1* | 1/2012 | Perry | ............... | H04L 65/4025 709/219 |
| 2013/0260896 A1* | 10/2013 | Miura | ............... | A63F 13/47 463/42 |
| 2013/0344960 A1* | 12/2013 | Perry | ............... | A63F 13/77 463/32 |
| 2014/0094302 A1 | 4/2014 | Wilkiewicz et al. | | |
| 2016/0045826 A1* | 2/2016 | Speck | ............... | A63F 13/493 463/31 |
| 2018/0001194 A1* | 1/2018 | Sherwani | ............... | A63F 13/355 |
| 2021/0093952 A1* | 4/2021 | Ronsse | ............... | G06F 13/38 |
| 2021/0113930 A1* | 4/2021 | Miura | ............... | A63F 13/355 |
| 2021/0326145 A1* | 10/2021 | Wu | ............... | A63F 13/35 |

FOREIGN PATENT DOCUMENTS

CN 111632373 A 9/2020
CN 112169320 A 1/2021

* cited by examiner (a)          (b)

(a)           (b)

APPLICATION STARTUP AND ARCHIVING

RELATED APPLICATIONS

The present application is a continuation of International Application No. PCT/CN2021/117770, entitled "APPLICATION PROGRAM STARTING AND SAVING METHODS, APPARATUS AND DEVICE, AND STORAGE MEDIUM" and filed on Sep. 10, 2021, which claims priority to Chinese Patent Application No. 202011011843.3, entitled "METHOD AND APPARATUS FOR APPLICATION STARTUP, METHOD AND APPARATUS FOR APPLICATION ARCHIVING, DEVICE, AND STORAGE MEDIUM" filed on Sep. 23, 2020. The entire disclosures of the prior applications are incorporated herein by reference in their entirety.

FIELD OF THE TECHNOLOGY

Embodiments of this application relate to the field of cloud computing and cloud gaming technologies, and including a method and apparatus for application startup, a method and apparatus for application archiving, a device, and a storage medium.

BACKGROUND OF THE DISCLOSURE

Cloud gaming is an online gaming technology based on cloud computing technology, and has the advantage of light weight compared to conventional game running modes. Cloud gaming gets rid of the dependence on hardware resources. Because cloud gaming runs on the server side, the client side does not need to have powerful graphics computing and data processing capabilities.

Because cloud gaming has advantages that conventional game running modes cannot achieve, more and more cloud games have been developed and released to users. In the related art, in a process of a user operating a cloud game, a cloud game video is formed by recording the process of the user operating the cloud game, and the cloud game video is posted on a specific webpage or specific client. Then the process of the user operating the cloud game can be watched by clicking the cloud game video on the posting platform. However, in the process of watching the cloud game video, users may want to operate the cloud game. In this case, the user needs to first determine the cloud game corresponding to the cloud game video, then find the posting platform corresponding to the cloud game, and click the cloud game in the posting platform to load the cloud game, thereby realizing the purpose of operating the cloud game.

It can be seen that in the related art, the startup process of the cloud game is complicated and inefficient, and it is very likely that users cannot accurately determine the cloud game corresponding to the cloud game video, failing to meet the users' need to operate the cloud game.

SUMMARY

Embodiments of this disclosure include a method and apparatus for application startup, a method and apparatus for application archiving, devices, and non-transitory computer-readable storage mediums. The embodiments can be used, for example, to conveniently start a cloud game application. The technical solutions include the following.

According to one aspect, a method for starting an application is provided. A video that includes game content of a game application is played back. A startup operation to start the game application is received from a user during the playback of the video. The game application is started in response to the startup operation. Further, the game content of the started game application that is determined to match the game content of the video displayed when the startup operation is received from the user is displayed. The game content of the started game application is determined based on when the startup operation is received from the user during the playback of the video.

According to another aspect, a method for application archiving is provided. A video of game play of a game application is recorded. A game archive corresponding to the game application is generated. The game archive includes game data of a game progress associated with the game play. The video is associated with the game archive to obtain playback data corresponding to the game application. Further, the playback data is stored.

According to still another aspect, an apparatus for application startup is provided. The apparatus includes processing circuitry that is configured to play a video that includes game content of a game application. The processing circuitry is configured to receive a startup operation to start the game application from a user during the playback of the video. The processing circuitry is configured to start the game application in response to the startup operation. Further, the processing circuitry is configured to display the game content of the started game application that is determined to match the game content of the video displayed based on when the startup operation is received from the user. The game content of the started game application is determined based on when the startup operation is received from the user during the playback of the video.

According to yet another aspect, an apparatus for application archiving is provided. The apparatus includes processing circuitry that is configured to record a video of game play of a game application. The processing circuitry is configured to generate a game archive corresponding to the game application. The game archive includes game data of a game progress associated with the game play. The processing circuitry is configured to associate the video with the game archive to obtain playback data corresponding to the game application. Further, the processing circuitry is configured to store the playback data.

According to still another aspect, an embodiment of this disclosure provides a terminal, including a processor and a memory, the memory storing at least one instruction, at least one program, a code set, or an instruction set, the at least one instruction, the at least one program, the code set, or the instruction set being loaded and executed by the processor to implement the method for application startup or the method for application archiving.

According to yet another aspect, an embodiment of this disclosure provides a non-transitory computer-readable storage medium storing instructions which when executed by a processor cause the processor to implement the method for application startup or the method for application archiving.

According to a further aspect, an embodiment of this disclosure provides a computer program product or a computer program, the computer program product or the computer program including computer instructions, the computer instructions being stored in a computer-readable storage medium. A processor of a terminal reads the computer instructions from the computer-readable storage medium and executes the computer instructions, to cause the terminal to implement the method for application startup or the method for application archiving.

The technical solutions provided in the embodiments of this disclosure may bring the following beneficial effects:

In a process of playing a game video corresponding to a cloud game application, a startup operation performed on the cloud game application is received. In response to the startup operation, the cloud game application is started and run. Whereby, the cloud game application can be started conveniently in the process of playing the game video, which not only simplifies the process of starting the cloud game application, but also improves the efficiency of starting the cloud game application. In addition, in the embodiments of this disclosure, the game screen content displayed by the cloud game application in the initial display interface after startup matches with the game screen content displayed in the screen frame of the game video at the moment of receiving the startup operation, thereby avoiding a deviation between the game progress of the cloud game application and the game progress shown in the game video, ensuring that the user operates the cloud game application from the starting point of the game that the user chooses or is interested in, and achieving a "you can play what you see" effect.

BRIEF DESCRIPTION OF THE DRAWINGS

To describe technical solutions in embodiments of this disclosure more clearly, the following briefly introduces accompanying drawings required for describing the embodiments. Apparently, the accompanying drawings in the following description show merely some embodiments of this disclosure, and a person of ordinary skill in the art may still derive other accompanying drawings according to the accompanying drawings without creative efforts.

DESCRIPTION OF EMBODIMENTS

To make objectives, technical solutions, and advantages of this disclosure clearer, the following further describes implementations of this disclosure in detail with reference to the accompanying drawings.

First, cloud computing and cloud gaming involved in the embodiments of this disclosure are described.

1. Cloud Computing.

Cloud computing is a computing mode, in which computing tasks are distributed on a resource pool formed by a large quantity of computers, so that various application systems can obtain computing power, storage space, and information services according to requirements. A network that provides resources is referred to as a "cloud". For a user, resources in a "cloud" seem to be infinitely expandable, and can be obtained readily, used on demand, expanded readily, and paid per use.

An infrastructure capability provider of cloud computing establishes a cloud computing resource pool (briefly referred to as "cloud platform", also known as an Infrastructure as a Service (IaaS) platform), and deploys various types of virtual resources for external users to choose and use. The cloud computing resource pool mainly includes: computing devices (which are virtualization machines, including operating systems), storage devices, and network devices.

Through division according to logical functions, a Platform as a Service (PaaS) layer may be deployed on the IaaS layer, and a Software as a Service (SaaS) layer may be deployed on the PaaS layer, or the SaaS layer may be directly deployed on the IaaS layer. PaaS is a platform on which software runs, such as databases, World Wide Web (Web) containers, etc. SaaS is a variety of service software, such as Web portals, SMS group senders, and so on. Generally speaking, SaaS and PaaS are upper layers relative to IaaS.

2. Cloud Gaming.

Cloud gaming, also known as game-on-demand, is an online gaming technology based on cloud computing technology. The cloud gaming technology enables thin clients with relatively limited graphics processing and data computing capabilities to run high-quality games. In a cloud gaming scenario, the game does not run on a user's gaming terminal, but on a cloud server, and the cloud server renders a game scene as an audio and video stream and transmits same to the user's gaming terminal through a network. The user's gaming terminal does not need to have powerful graphics computing and data processing capabilities, but only needs to have a basic streaming media playback capability and an ability to obtain instructions inputted by the user and transmit the instructions to the cloud server.

Figure 1:
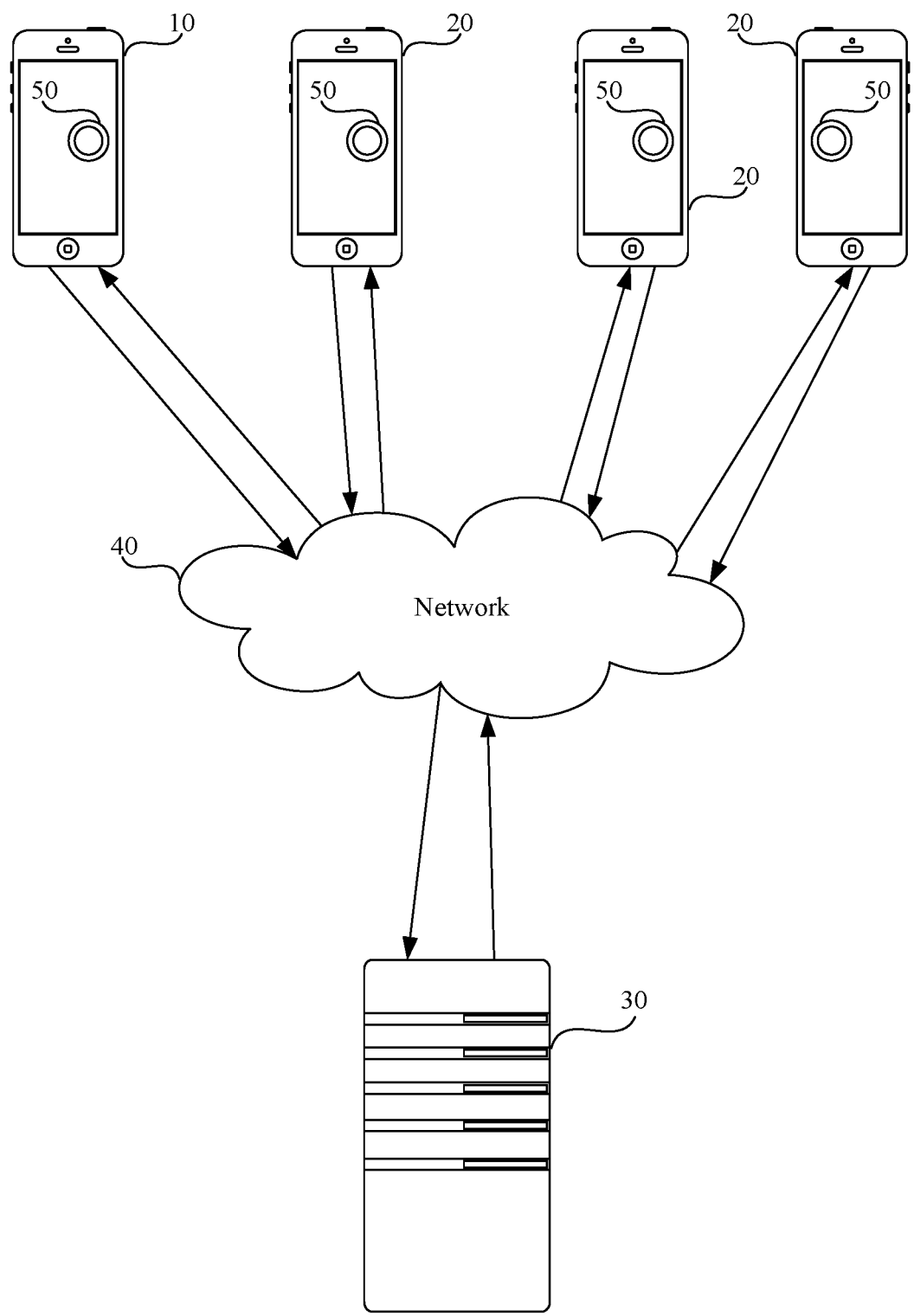
FIG. 1 is a schematic diagram of a cloud game management system according to an embodiment of this disclosure.

FIG. 1 is a schematic diagram of a cloud game management system according to an embodiment of this disclosure. The cloud game management system includes: a first terminal 10, a second terminal 20, and a cloud game server 30.

The first terminal 10 and the second terminal 20 may each be an electronic device such as a mobile phone, a tablet computer, a game console, an ebook reader, a multimedia player, a wearable device, or a personal computer (PC). In an example, a client 50 running a cloud game application (i.e., cloud game described above) are installed on the first terminal 10 and the second terminal 20. Alternatively, the client 50 running the cloud game application is not installed on the first terminal 10 and the second terminal 20, but instead, the first terminal 10 and the second terminal 20 obtain data of the cloud game application from the cloud game server 30 after receiving a startup operation performed on the cloud game application, to load the cloud game application. The dependency relationship of the cloud game application is not limited in the embodiments of this disclosure. In an example, the cloud game application is an independent application that can run directly in an operating system without relying on other applications. For example, the cloud game application is a mobile phone application (APP). Alternatively, the cloud game application is a sub-application of a target application and needs to rely on the target application to run. For example, the cloud game application is a small program.

When the cloud game application is the sub-application of the target application, the user can directly open the cloud game application by scanning a two-dimensional code corresponding to the cloud game application or searching for a name of the cloud game application. The cloud game application can be easily obtained and transferred in the target application. The target application is an application used for carrying the cloud game application, and provides an environment for the realization of the cloud game application. The target application is a native application, and may be directly run on an operating system. The specific type of the target application is not limited in the embodiments of this disclosure. In an example, the target application may be a social application, a dedicated application specially supporting the sub-application, a file management application, an email application, a game application, or the like. The social application includes an instant messaging application, a social network service (SNS), a live streaming application, or the like.

The first terminal 10 refers to a terminal held by a user who records or edits a cloud game video. The user who records or edits the cloud game video can start the cloud game application through the client of the cloud game application that is installed and run in the first terminal 10, and control the first terminal 10 to record a game screen of the cloud game application during running of the cloud game application, to form a cloud game video. In addition, the first terminal 10 may further record data involved during running of the cloud game application, and form a cloud game archive. Then, the first terminal 10 may transmit the cloud game video and the cloud game archive to the cloud game server 30 for storage.

The second terminal 20 refers to a terminal held by a user who watches the cloud game video. In an example, the user not only can watch cloud game video in the cloud game application, but also can watch cloud game video in other applications such as a live streaming applications, a social application, a video application, etc., or in a webpage, which is not limited in the embodiments of this disclosure. In addition, the second terminal 20 may also receive a rendered game screen from the cloud game server 30 and then load the game screen, and may receive an operation instruction inputted by the user.

In an example, the first terminal 10 can also be used to play the cloud game video, and the second terminal 20 can also be used to record or edit the cloud game video. That is, the first terminal 10 or the second terminal 20 can be used to record or edit the cloud game video, and play the cloud game video. In FIG. 1, for the convenience of description, the first terminal 10 is used for recording or editing the cloud game video, and the second terminal 20 is used for playing the cloud game video, but the technical solutions of this disclosure are not limited thereto.

The cloud game server 30 is configured to provide a backend service for the clients of the cloud game application that are installed and run in the first terminal 10 and the second terminal 20. For example, the cloud game server 30 may be a backend server of the cloud game application. The cloud game server 30 may be one server, a server cluster composed of a plurality of servers, or a cloud computing service center. In an example, the cloud game server 30 provides backend services for cloud game applications in a plurality of terminals at the same time.

In an example, the first terminal 10 and the cloud game server 30 communicate with each other through a network 40, and the second terminal 20 and the cloud game server 30 communicate with each other through the network 40. The network may be a wired network or a wireless network, which is not limited in the embodiments of this disclosure. In an example, the first terminal 10 transmits the cloud game video and/or cloud game data recorded during running of the cloud game application, etc. to the cloud game server 30. The cloud game server 30 renders the game screen of the cloud game according to the cloud game data, and transmits the rendered game screen to the second terminal 20. The second terminal 20 starts the cloud game application, loads the rendered game screen, receives a user operation, and so on.

It can be seen from the above that, in the process of watching the cloud game video, users may want to operate the cloud game application. In the related art, the user needs to first determine the cloud game application corresponding to the cloud game video, then find the posting platform corresponding to the cloud game application, and click the cloud game application in the posting platform to load the cloud game application, thereby realizing the purpose of operating the cloud game application. However, in the related art, the startup process of the cloud game application is complicated and inefficient, and it is very likely that users cannot accurately determine the cloud game application corresponding to the cloud game video, failing to meet the users' need to operate the cloud game application. To simplify the startup process of the cloud game application and meet the users' need to operate the cloud game application, the following two solutions may be used.

Figure 2:
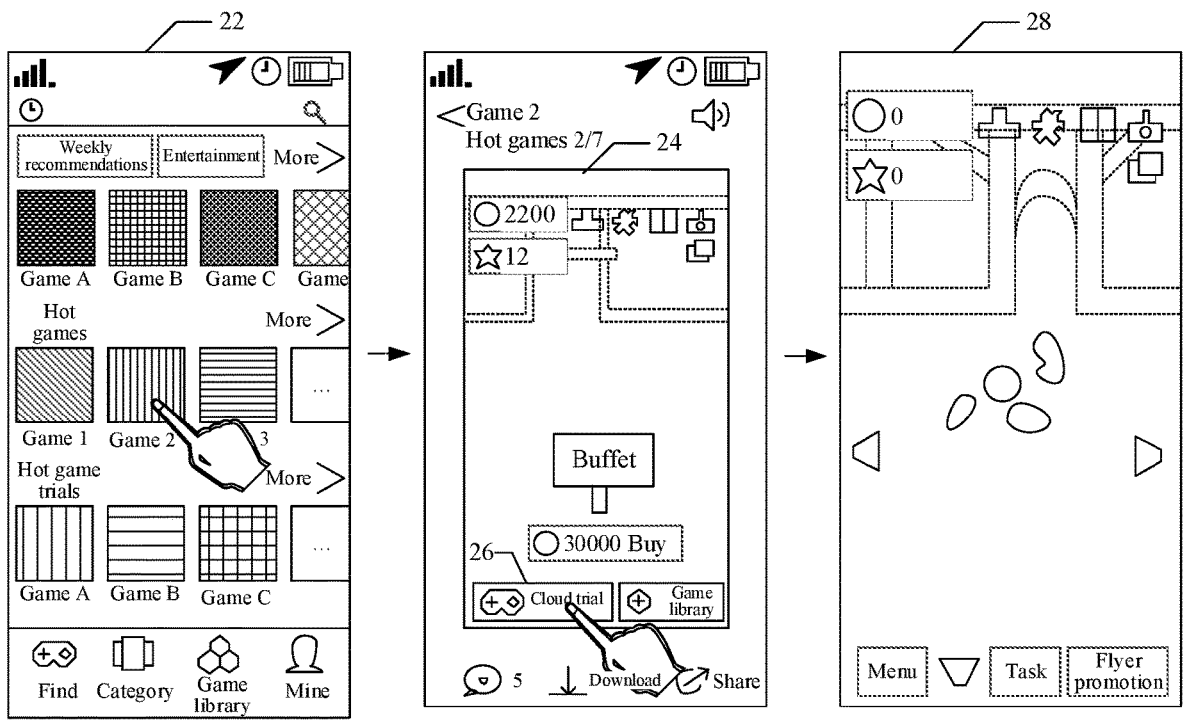
FIG. 2 is a schematic diagram showing a process of starting a cloud game application according to an embodiment of this disclosure.

In a first exemplary solution, as shown in FIG. 2, a game selection interface 22 is displayed in the second terminal, and the game selection interface 22 includes a cloud game video corresponding to at least one cloud game application. When the user clicks on any cloud game video, the second terminal displays a playing interface 24 of the cloud game video. The playing interface 24 of the cloud game video includes a trial play button 26, and the user clicks the trial play button 26 to trigger the second terminal to load the cloud game application. Then, the user can operate the cloud game application starting from a starting level of the cloud game application.

Figure 3:
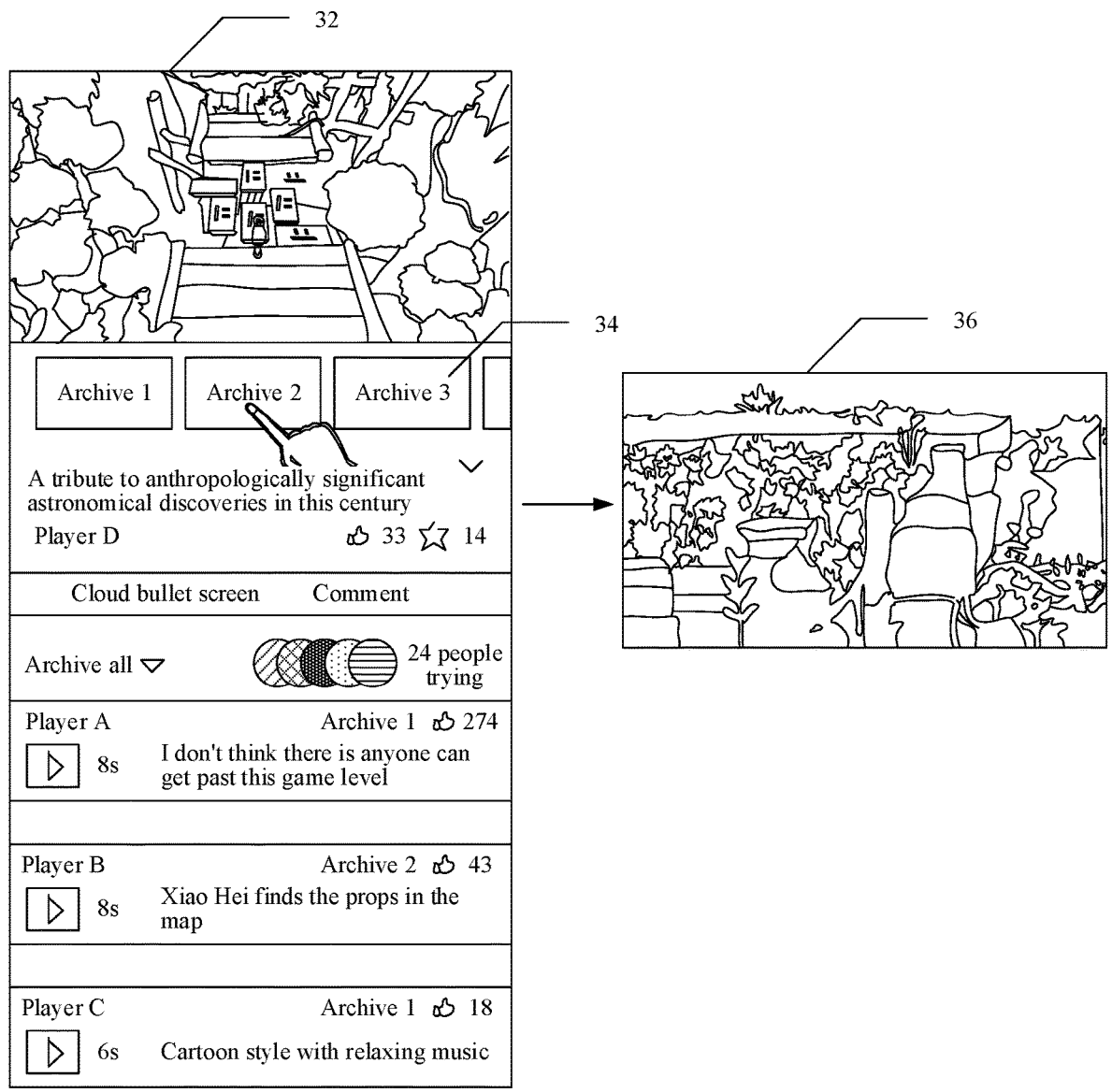
FIG. 3 is a schematic diagram showing a process of starting a cloud game application according to another embodiment of this disclosure.

In a second exemplary solution, as shown in FIG. 3, a playing interface 32 of a cloud game video is displayed in the second terminal, and the playing interface 32 of the cloud game video includes an option 34 of at least one game clip corresponding to the cloud game application. When the user clicks the option 34 of any game clip, the second terminal is triggered to load the cloud game application. Then, the user can operate the cloud game application starting from a starting moment of the game clip.

For the above first solution, the user operates the cloud game application starting from the starting level of the cloud game application, that is, an initial display interface 28 of the cloud game application after startup is a display interface corresponding to the starting level of the cloud game application. The user is not allowed to freely choose the starting point for operating the cloud game application, but needs to operate the cloud game application starting from the starting level. In addition, the cloud game video may not correspond to the starting level of the cloud game application, that is, a content displayed on the initial display interface 28 may be different from a content displayed on the playing interface 24 of the cloud game video. The reason why the user wants to operate the cloud game application may be that the user is interested in the content displayed in the cloud game video, if the user cannot operate the game clip the user is interested in after starting the cloud game application, user experience is affected.

For the above second solution, when the user clicks the option 34 of the game clip, the second terminal is triggered to load the cloud game application. An initial display interface 36 of the cloud game application after startup is a game screen corresponding to a starting moment of the game clip. However, at the moment when the user clicks the option 34 of the game clip, the cloud game video may not have been played to the game screen corresponding to the starting moment of the game clip, and the content displayed on the playing interface 32 of the cloud game video may not be the same as that on the game screen corresponding to the starting moment of the game clip, that is, the content displayed on the initial display interface 36 may be different from the content displayed on the playing interface 34 of the cloud game video, which affects the user experience. Moreover, after the cloud game application is started, the user can operate the cloud game application only starting from the starting moment of the selected game clip, so the user cannot accurately select the starting point for operating the cloud game application.

Based on this, the embodiments of this disclosure provide a method for application startup and archiving, which can be used to conveniently start a cloud game application and ensure that a playing interface of a cloud game video matches with an initial display interface of the cloud game application after startup. Next, the technical solutions of this disclosure are described in more detail below with reference to several embodiments.

Figure 4:
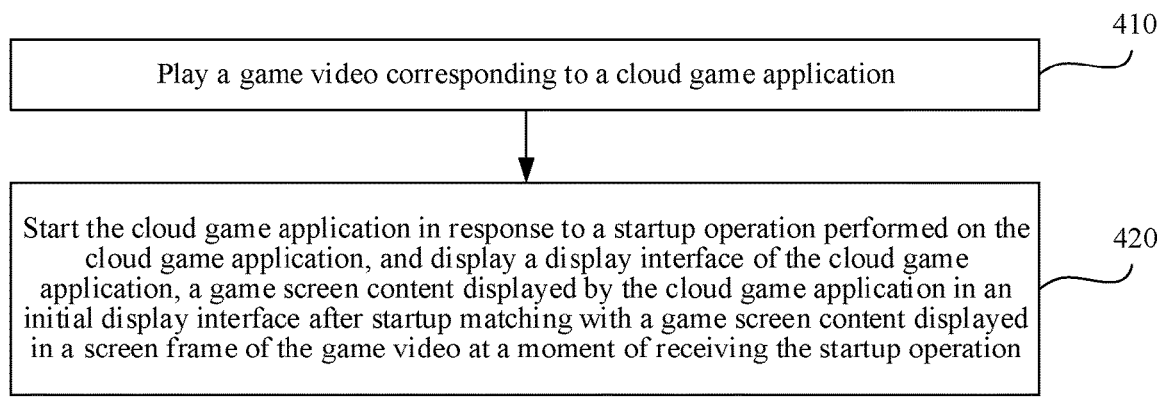
FIG. 4 is a flowchart of a method for application startup according to an embodiment of this disclosure.

FIG. 4 is a flowchart of a method for application startup according to an embodiment of this disclosure. The method can be applied to a terminal, such as the first terminal 10 and the second terminal 20 in the cloud game management system shown in FIG. 1 above. The method may include the following steps (steps 410-420):

A video that includes game content of a game application can be played back. For example, in step 410, a game video corresponding to a cloud game application is played back.

The game video corresponding to the cloud game application can refer to a game video related to the cloud game application, for example, a game video recorded during operation of the cloud game application by the user, a game video introducing the cloud game applications (for example, a game video introducing the mode of operating the cloud game application (such as automatic running, jumping, etc.)); a game video introducing various operation controls (such as buttons, sliders, etc.) in the cloud game application; a game video introducing the methods of usage of game operations (such as releasing skills, etc.) and virtual items (such as virtual missiles, virtual aircrafts, etc.) involved in the cloud game application; or a game video introducing the images of virtual characters involved in the cloud game application (such as dress-up of the virtual characters, etc.).

The terminal can play the game video corresponding to the cloud game application. The manner in which the terminal plays the game video is not limited in the embodiments of this disclosure. In an example, the terminal plays the game video on a webpage. For example, the user uploads the game video recorded during the operation of the cloud game application by the user to a website, and then a terminal accesses the website and plays the game video on the webpage. Alternatively, the terminal plays the game video in the cloud game application. For example, the cloud game application may provide a video playback function, and the user can watch the game video in the cloud game application through the video playback function. Alternatively, the terminal plays the game video in other applications that provide a video playback function, such as a live streaming application, a social application, a video application, etc.

In order to meet the need of the user to control the playback of the game video while watching the game video, in the embodiments of this disclosure, operation controls and indication information may be displayed on a game video playing interface of the cloud game application. The operation controls and the indication information include, for example, one or more of an exit control, a pause control, an acceleration control, a zoom control, a progress adjustment control, starting moment indication information, ending moment indication information, playback progress indication information, and the like. The display forms of the operation controls and the indication information are not limited in the embodiments of this disclosure. In an example, the operation controls include one or more of buttons, sliders, text boxes, etc. In an example, the indication information includes one or more of text indication information, color indication information, shape indication information, and the like. Of course, the user can also trigger the terminal in other ways to perform the functions that can be achieved by the above operation controls in other ways. For example, the user may trigger the terminal to pause, accelerate, exit, and zoom the game video through gestures, voice and other means.

Figure 5:
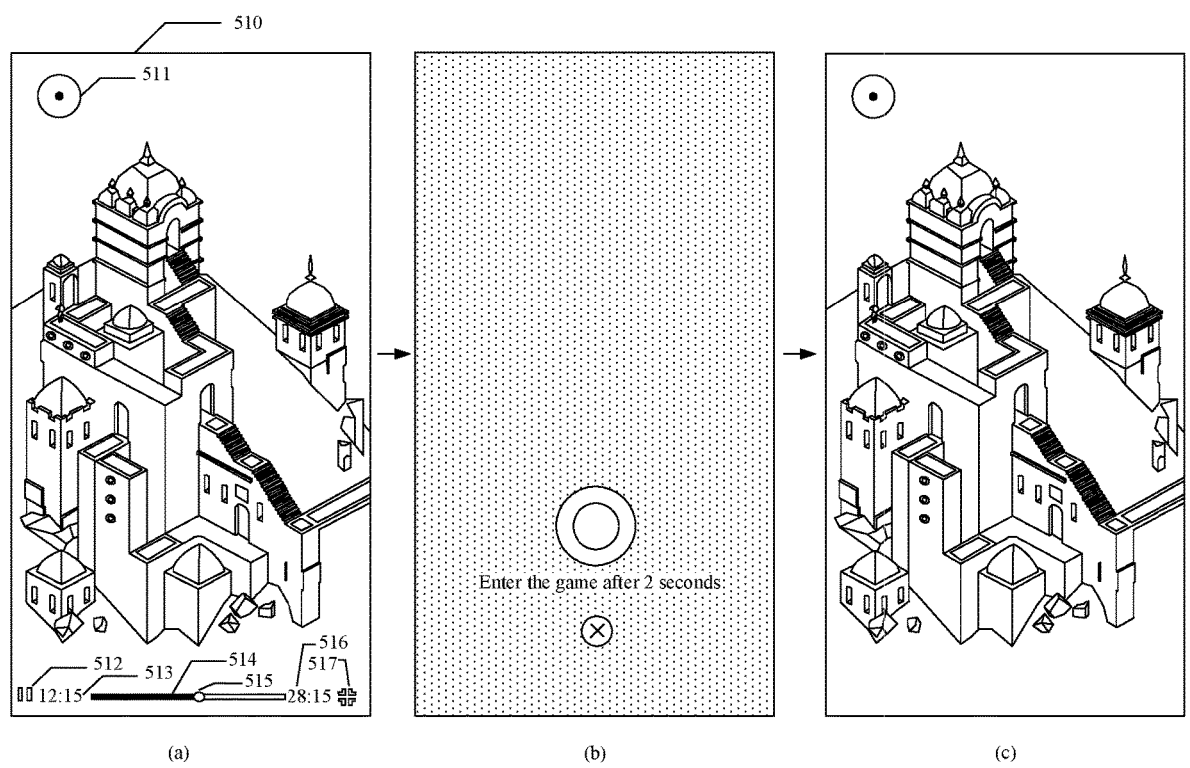
FIG. 5 is a schematic diagram showing a process of starting a cloud game application according to still another embodiment of this disclosure.

As shown in FIG. 5, FIG. 5(*a*) shows a playing interface of a game video according to an embodiment of this disclosure. The playing interface 510 of the game video includes an exit control 511, a pause control 512, starting moment indication information 513, playback progress indication information 514, a progress adjustment control 515, ending moment indication information 516, and a zoom control 517.

A game application can be started in response to a startup operation. Further, the game content of the started game application that is determined to match the game content of the video displayed when the startup operation is received from the user can be displayed. The game content of the started game application can be determined based on when the startup operation is received from the user during the playback of the video. For example, in step 420, the cloud game application is started in response to a startup operation performed on the cloud game application, and a display interface of the cloud game application is displayed, a game screen content displayed by the cloud game application in an initial display interface after startup matching with a game screen content displayed in a screen frame of the game video at a moment of receiving the startup operation.

During the process of playing the game video corresponding to the cloud game application, the terminal may receive the startup operation performed on the cloud game application. The manner of triggering the startup operation is not limited in the embodiments of this disclosure. In an example, the playing interface of the game video includes a startup control of the cloud game application. When the user touches the startup control, the terminal is triggered to receive the startup operation performed on the cloud game application, so that the terminal can start the cloud game application. Alternatively, in the process of playing the game video, the terminal receives an operation or instruction inputted in the playing interface of the game video, and when the inputted operation or instruction matches with a preset operation or instruction, the terminal receives the startup operation performed on the cloud game application. The preset operation or instruction is a pre-defined operation or instruction used to trigger the cloud game application. Alternatively, in the process of playing the game video, the user touches the playing interface of the game video to trigger the terminal to display the startup control of the cloud game application; then when the user touches the startup control, the terminal is triggered to receive the startup operation performed on the cloud game application. Alternatively, in the process of playing the game video, the user triggers the terminal to receive the startup operation performed on the cloud game application through voice, gesture, AI, or other operations. For other descriptions of the startup operation, reference can be made to the following embodiments, and the details will not be repeated here.

The terminal may start the cloud game application in response to receiving the startup operation performed on the cloud game application, and display the display interface of the cloud game application, In the embodiments of this disclosure, a game screen content displayed by the cloud game application in an initial display interface after startup matches with a game screen content displayed in a screen frame of the game video at a moment of receiving the startup operation. For example, as shown in FIG. 5, the game screen content displayed in the screen frame of the game video when the terminal receives the startup operation is shown in FIG. 5(a). After the terminal starts and runs the cloud game application, the game screen content displayed on the initial display interface of the cloud game application is shown in FIG. 5(c).

It is to be understood that "two game screen contents matching with each other" in the embodiments of this disclosure include but are not limited to any one of the following: the two game screen contents are the same, the two game screen contents are coherent, the two game screen contents are consistent, and the two game screen contents are similar. For example, the game screen content displayed by the cloud game application in the initial display interface after startup is the same as the game screen content displayed in the screen frame of the game video at the moment of receiving the startup operation. In another example, the game screen content displayed by the cloud game application in the initial display interface after startup is coherent with the game screen content displayed in the screen frame of the game video at the moment of receiving the startup operation. In other words, the game screen content displayed by the cloud game application in the initial display interface after startup is a game screen content displayed immediately following the game screen content displayed in the screen frame of the game video at the moment of receiving the startup operation, or is a game screen content displayed in a screen frame next to the screen frame of the game video at the moment of receiving the startup operation.

In the embodiments of this disclosure, it is ensured that the game screen content displayed by the cloud game application in the initial display interface matches with the game screen content displayed in the screen frame of the game video at the moment of the terminal receiving the startup operation, thereby avoiding a deviation between the game progress of the cloud game application and the game progress shown in the game video, ensuring that the user operates the cloud game application from the starting point of the game that the user chooses, and achieving a "you can play what you see" effect. For descriptions of how to start and run the cloud game application and how to display the initial display interface of the cloud game application after startup, reference can be made to the following embodiments, and the details will not be repeated here.

In an example, in the process of starting the cloud game application in response to receiving the startup operation performed on the cloud game application, the terminal may display a loading interface of the cloud game application, where the loading interface is used to prompt that the cloud game application is being loaded. In an example, the loading interface includes waiting time indication information and/or a cancellation control, the waiting time indication information is used for indicating a waiting time before the initial display interface of the cloud game application is displayed, and the cancellation control is used to cancel the loading of the cloud game application. In response to receiving a triggering operation performed on the cancellation control, the terminal can cancel the loading of the cloud game application and continue to play the game video of the cloud game application.

As shown in FIG. 5, when the game video is played to the screen frame shown in FIG. 5(a), the terminal receives the startup operation performed on the cloud game application, and displays a loading interface of the cloud game application as shown in FIG. 5(b). The loading interface includes the waiting time indication information and the cancellation control. If the terminal does not receive a touch operation performed on the cancellation control or does not receive any other cancellation operation for canceling the loading of the cloud game application during the process of displaying the loading interface, the initial display interface of the cloud game application shown in FIG. 5(c) is displayed after the cloud game application is loaded. The game screen content displayed in the screen frame of the game video as shown in FIG. 5(a) matches with the game screen content displayed in the initial display interface of the cloud game application after startup as shown in FIG. 5(c).

Based on the above, in the technical solutions provided by the embodiments of this disclosure, in a process of playing a game video corresponding to a cloud game application, a startup operation performed on the cloud game application is received. In response to the startup operation, the cloud game application is started and run. Whereby, the cloud game application can be started conveniently in the process of playing the game video, which not only simplifies the process of starting the cloud game application, but also improves the efficiency of starting the cloud game application. In addition, in the embodiments of this disclosure, the game screen content displayed by the cloud game application in the initial display interface after startup matches with the game screen content displayed in the screen frame of the game video at the moment of receiving the startup operation, thereby avoiding a deviation between the game progress of the cloud game application and the game progress shown in the game video, ensuring that the user operates the cloud game application from the starting point of the game that the user chooses or is interested in, and achieving a "you can play what you see" effect.

The embodiments of this disclosure provide various triggering methods for the startup operation of the cloud game application. Hereinafter, several methods for triggering the startup operation according to the embodiments of this disclosure will be described.

In an example, after step 410, the method further includes: receiving a first operation performed on a playing interface of the game video; and determining that the startup operation is received, in response to the first operation matching with a game control operation.

In the process of watching the game video, the user is likely to have the need to operate the cloud game application. For example, when an operation control in the cloud game application shown in the game video is a newly developed operation control of the cloud game application, the user is likely to have the need to touch the operation control. When the user needs to operate the cloud game application, the user can input a first operation into the playing interface of the game video. For example, when the user needs to operate a slider in the cloud game application, the user may input a slide (or drag, move, etc.) operation into the playing interface of the game video. The terminal may receive the first operation inputted in the playing interface of the game video, that is, receive the first operation performed on the playing interface of the game video.

In response to receiving the first operation, the terminal may compare the first operation with a game control operation, and when the first operation matches with the game control operation, determine that a startup operation performed on the cloud game application is received, and start and run the cloud game application. The game control operation is an operation received by the cloud game application indicated by the game video. During the process of playing the game video, the terminal may also obtain the game control operation.

The manner in which the terminal obtains the game control operation is not limited in the embodiments of this disclosure. In an example, when starting to play the game video or before playing the game video, the terminal obtains the game control operation in advance, which can be directly used later. Alternatively, in the process of playing the game video, the terminal obtains in real time, according to a timestamp corresponding to a screen frame of the game video, a game control operation corresponding to the timestamp. Alternatively, before starting to play the game video or before playing the game video, the terminal obtains the game control operation in advance, and stores the game control operation in a cache; subsequently, in the process of playing the game video, the terminal obtains in real time, according to a timestamp corresponding to a screen frame of the game video, a game control operation corresponding to the timestamp from the cache.

The game control operation can be indicated in operation data. The operation data can be stored in game data of the cloud game application, that is, the terminal can obtain the operation data from the game data and determine the game control operation indicated in the operation data. The game data refers to data involved during the game progress of the cloud game application, including, for example, operation data, path data of virtual objects controlled by users, and data of virtual resources (such as virtual costumes, virtual items, etc.) owned by virtual objects controlled by users. In an example, after the receiving a first operation performed on a playing interface of the game video, the method further includes: determining a second timestamp; and obtaining game data corresponding to the second timestamp.

The second timestamp is a timestamp corresponding to the screen frame of the game video at the moment of receiving the first operation. The terminal may determine the timestamp corresponding to the screen frame of the game video while receiving the first operation. In the embodiments of this disclosure, the game data of the cloud game application is associated with the game video of the cloud game application based on the timestamp. When the second timestamp is determined, the terminal can obtain game data corresponding to the second timestamp. The game data corresponding to the second timestamp includes operation data corresponding to the second timestamp, the operation data corresponding to the second timestamp being used for indicating a game control operation received at the second timestamp.

The specific method for matching the first operation with the game control operation is not limited in the embodiments of this disclosure. In an example, the terminal may respectively obtain operation data of the first operation and operation data indicating the game control operation, then compare the two pieces of operation data, and when the two pieces of operation data have consistent parameter information, determine that the first operation matches with the game control operation. In an example, the operation data includes parameter information such as operation type, operation location information, operation duration, and operation times.

It is to be understood that "the two pieces of operation data have consistent parameter information" in this example includes, but is not limited to, at least one of the following: the two pieces of operation data has identical parameter information, the two pieces of operation data has similar parameter information, the parameter information of one piece of operation data includes the parameter information of the other piece of operation data, and the like. For example, if the operation data includes information about two parameters, operation type and operation times, the operation data of the first operation is a double-click operation, and the operation data indicating the game control operation is also a double-click operation, the terminal can determine that the first operation matches with the game control operation. In another example, the operation data includes information about one parameter, operation duration, the operation data of the first operation is an operation with a duration of 2.2 seconds, and the operation data indicating the game control operation is an operation with a duration of 2.21 seconds. Because the duration of 2.2 seconds is similar to the duration of 2.21 seconds, the terminal may determine that the first operation matches with the game control operation. In still another example, the operation data includes information about one parameter, operation location, the operation data of the first operation is an operation of sliding a first slider from the left side of the interface to the middle of the interface, and the operation data indicating the game control operation is an operation of sliding the first slider from the left side of the interface to the right side of the interface. Because the "operation of sliding the first slider from the left side of the interface to the right side of the interface" includes the "operation of sliding the first slider from the left side of the interface to the middle of the interface", the terminal can determine that the first operation matches with the game control operation.

Figure 6:
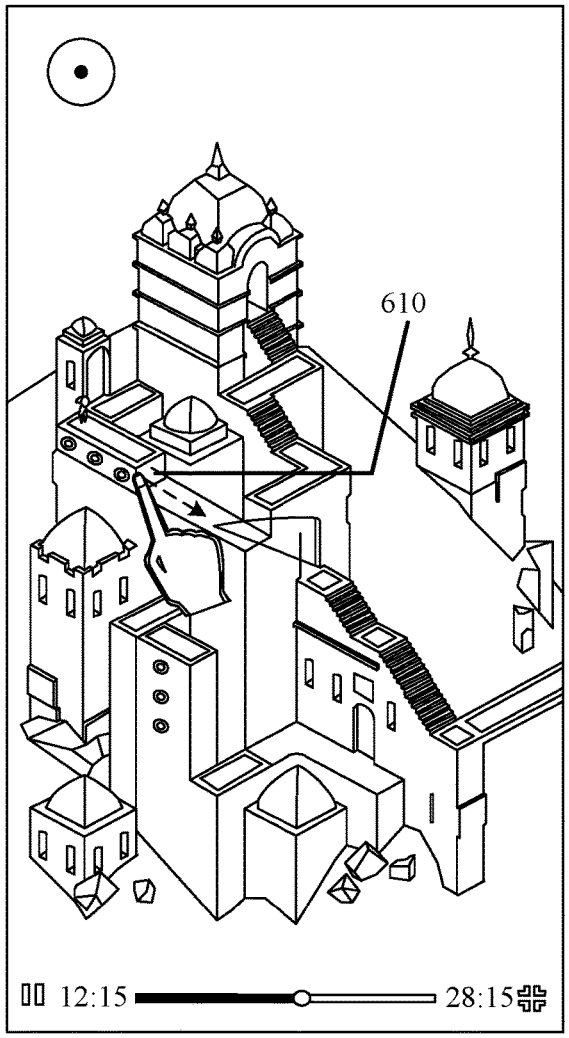
FIG. 6 is a schematic diagram showing a process of triggering a startup operation according to an embodiment of this disclosure.
Figure 6:
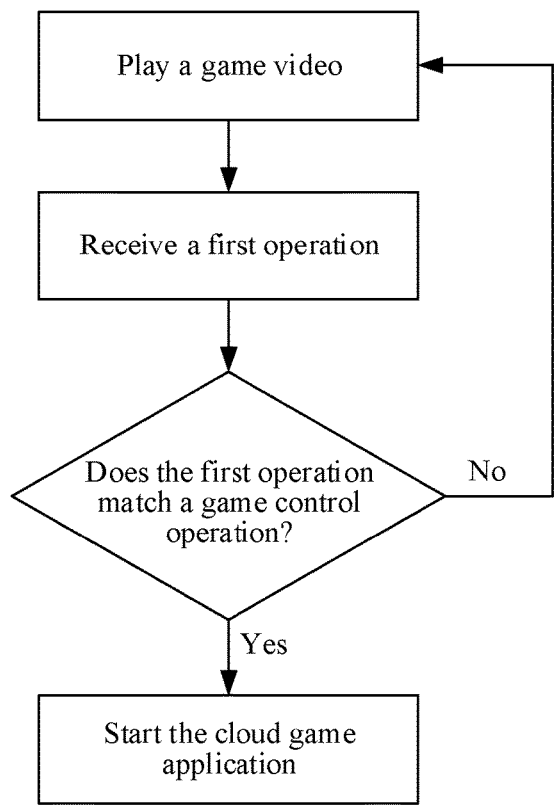

As shown in FIG. 6, FIG. 6(*a*) is a schematic diagram of triggering a startup operation according to an embodiment of this disclosure, and FIG. 6(*b*) is a flowchart of triggering a startup operation according to an embodiment of this disclosure. First, the terminal plays a game video corresponding to the cloud game application. When the game video is played to a screen frame shown in FIG. 6(a), the game video indicates that when user A operates the cloud game application, the game control operation received by the cloud game application is dragging a slider 610 toward the lower right of the interface. In this case, the terminal also receives a first operation performed by user B watching the game video on the playing interface of the game video. In addition, the terminal determines whether the first operation matches with the game control operation. When the first operation matches with the game control operation (for example, the first operation is also dragging the slider 610 toward the lower right of the interface), the terminal determines that a startup operation performed on the cloud game application is received, and starts and runs the cloud game application. When the first operation does not match with the game control operation (for example, the first operation is dragging the slider 610 toward the top of the interface, or, the first operation is also dragging the slider 610 toward the bottom right of the interface but starts from a different starting point from that of the first operation, for example, the starting point of the game control operation is in an area where the slider 610 is located, but the starting point of the first operation is in a blank area of the interface), the terminal continues to play the game video corresponding to the cloud game application.

In another example, after step 410, the method further includes: displaying a startup control of the cloud game application in response to a second operation performed on a playing interface of the game video; and determining that the startup operation is received, in response to a third operation performed on the startup control.

When the user needs to operate the cloud game application, the user can also input a second operation into the playing interface of the game video. For example, when the user needs to operate a slider in the cloud game application, the user may input a click operation into the playing interface of the game video. The terminal may receive the second operation inputted in the playing interface of the game video, that is, receive the second operation performed on the playing interface of the game video.

The operation type of the second operation is not limited in the embodiments of this disclosure. In an example, the second operation is a click operation, a pressing operation, a sliding operation, and the like. The operation location of the second operation is not limited in the embodiments of this disclosure. In an example, the operation location of the second operation is an area other than the positions of existing operation controls in the playing interface of the game video. For example, the playing interface of the game video includes a pause control, an exit control, a progress adjustment control, and a zoom control. In this case, the second operation can be applied to any area except where the pause control, the exit control, the progress adjustment control, and the zoom control are located.

In response to receiving the second operation, the terminal may display the startup control of the cloud game application. The startup control can be displayed on the playing interface of the game video, or can be displayed on a display layer above the layer where the playing interface of the game video is located. The display position of the startup control is not limited in the embodiments of this disclosure. In an example, the display position of the startup control corresponds to the operation location of the second operation; or, the display position of the startup control is a preset display position; or, the display position of the startup control is a random display position. In an example, the display of the startup control does not block main display elements in the playing interface of the game video, for example, does not block the display of other controls, does not block the display of virtual characters in a virtual environment indicated in the game video, and so on. The display form of the startup control is not limited in the embodiments of this disclosure. In an example, the startup control is a button, slider, etc. Alternatively, the startup control may further include text prompt information to prompt the user to touch the startup control to trigger the terminal to start and run the cloud game application.

In response to a touch operation performed by the user on the startup control, that is, in response to the third operation, the terminal determines that the startup operation is received. For example, when the startup control is a button, the user can click the button to trigger the terminal to receive the startup operation performed on the cloud game application; when the startup control is a slider, the user can slide the slider to trigger the terminal to receive the startup operation performed on the cloud game application. In an example, in response to a touch operation performed by the user on an area other than the area where the startup control is located, the terminal cancels the display of the startup control, so as not to affect the user's viewing of the game video.

Figure 7:
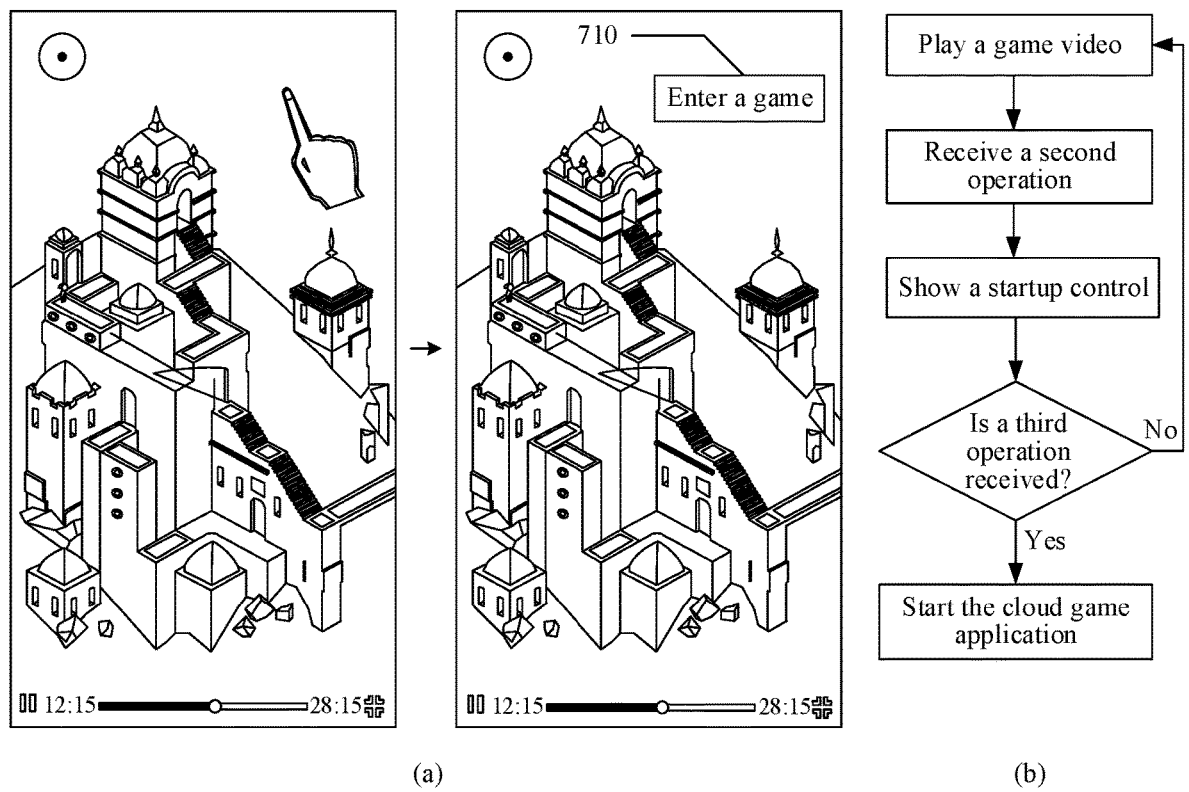
FIG. 7 is a schematic diagram showing a process of triggering a startup operation according to another embodiment of this disclosure.

As shown in FIG. 7, FIG. 7(a) is a schematic diagram of triggering a startup operation according to an embodiment of this disclosure, and FIG. 7(b) is a flowchart of triggering a startup operation according to an embodiment of this disclosure. First, the terminal plays a game video corresponding to the cloud game application. When the game video is played to a screen frame shown in FIG. 7(a), the user clicks a playing interface of the game video to trigger the terminal to receive the second operation. In response to receiving the second operation, the terminal displays a startup control 710 of the cloud game application. The display position of the startup control 710 may be a click position of the user's click on the playing interface, or may be a pre-defined display position. Afterward, when the user touches the startup control, the terminal receives the third operation performed on the startup control, and starts and runs the cloud game application. When the user touches an area other than the area where the startup control is located, e.g., the user clicks on a blank area in the playing interface, the terminal cancels the display of the startup control 710 and continues to play the game video corresponding to the cloud game application.

In still another example, after step 410, the method further includes: receiving a fourth operation performed on a playing interface of the game video; and determining that the startup operation is received, in response to the fourth operation matching with a preset startup operation.

When the user needs to operate the cloud game application, the user can also input a fourth operation into the playing interface of the game video. For example, when the user needs to operate a slider in the cloud game application, the user may input a touch and hold operation into the playing interface of the game video. The terminal may receive the fourth operation inputted in the playing interface of the game video, that is, receive the fourth operation performed on the playing interface of the game video.

In response to receiving the fourth operation, the terminal may compare the fourth operation with a preset startup operation, and if when the fourth operation matches with the preset startup operation, determine that the startup operation performed on the cloud game application is received. The preset startup operation is a preset operation for starting the cloud game application. In an example, the preset startup operation is one or more of operation modes such as a double-click operation, a touch and hold operation, and a slide-down operation. In the embodiments of this disclosure, the preset startup operation may be defined by the user; or the preset startup operation may be defined by a developer of the cloud game application; or a default startup operation may be defined by the developer of the cloud game application, and subsequently the default preset startup operation may be modified by the user to meet the user's personalized needs. In addition, in the embodiments of this disclosure, not only the operation type of the preset startup operation can be defined, but also an operation attribute (such as operation times, operation duration, and operation location) of the preset startup operation can be defined. In addition, in order to prevent the user from accidentally touching other operation controls in the playing interface, in the embodiments of this disclosure, the operation location of the preset startup operation may avoid the display positions of other operation controls in the playing interface.

In the embodiments of this disclosure, multiple preset startup operations may be defined, that is, the preset startup operation includes multiple operation types, allowing the user to subsequently flexibly start the cloud game application. For example, the preset startup operation includes a double-click operation and a touch and hold operation. Subsequently in the process of watching the game video, the user can either trigger the terminal to receive the startup operation through a double-click operation, or trigger the terminal to receive the startup operation through a touch and hold operation.

The specific method for matching the fourth operation with the preset startup operation is not limited in the embodiments of this disclosure. In an example, the terminal may respectively obtain operation data of the fourth operation and operation data of the preset startup operation, then compare the two pieces of operation data, and when the two pieces of operation data have consistent parameter information, determine that the fourth operation matches with the preset startup operation. In an example, the operation data includes parameter information such as operation type, operation location information, operation duration, and operation times.

It is to be understood that "the two pieces of operation data have consistent parameter information" in this example includes, but is not limited to, at least one of the following: the two pieces of operation data has identical parameter information, the two pieces of operation data has similar parameter information, the parameter information of one piece of operation data includes the parameter information of the other piece of operation data, and the like. For example, the operation data includes information about two parameters, operation type and operation duration, the operation data of the fourth operation is a touch and hold operation with a duration of 2 seconds, and the preset startup operation is a touch and hold operation with a duration of 1.5 seconds. Because the fourth operation and the preset startup operation are both touch and hold operations, and the operation duration of 2 seconds includes the operation duration of 1 second, the terminal may determine that the fourth operation matches with the preset startup operation. In another example, the operation data includes information about one parameter, operation duration, the operation data of the fourth operation is an operation with a duration of 2.2 seconds, and the operation data indicating the preset startup operation is an operation with a duration of 2.21 seconds. Because the duration of 2.2 seconds is similar to the duration of 2.21 seconds, the terminal may determine that the first operation matches with the preset startup operation.

Figure 8:
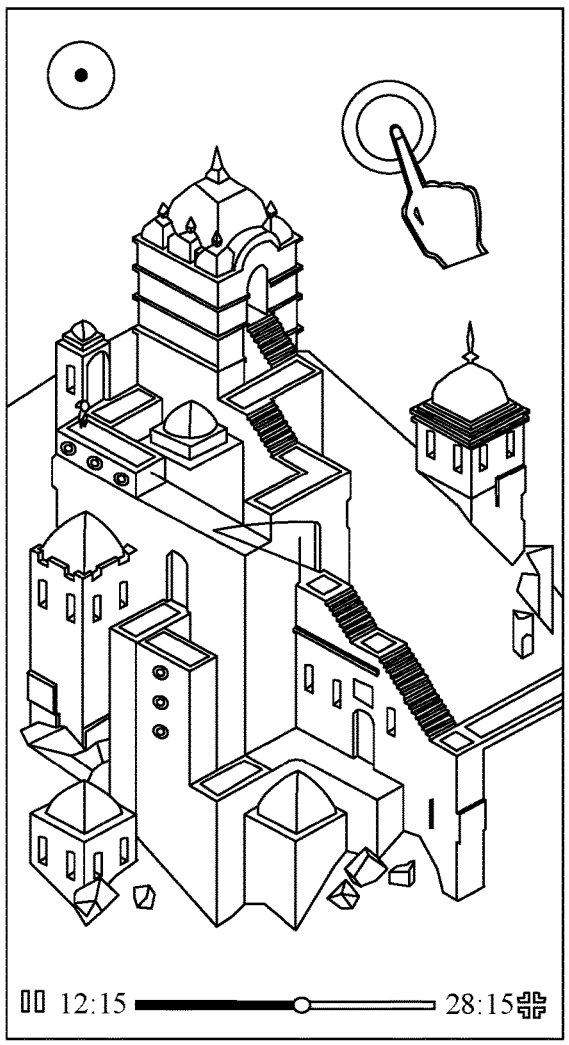
FIG. 8 is a schematic diagram showing a process of triggering a startup operation according to still another embodiment of this disclosure.
Figure 8:
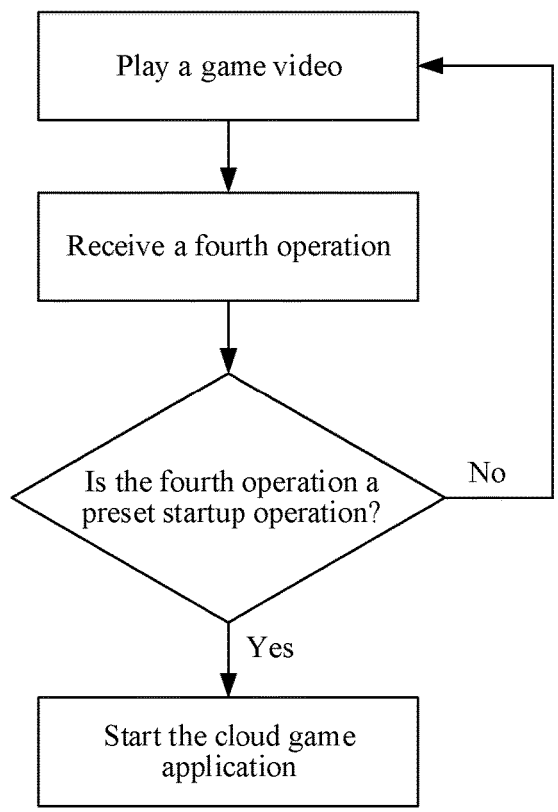

As shown in FIG. 8, FIG. 8(a) is a schematic diagram of triggering a startup operation according to an embodiment of this disclosure, and FIG. 8(b) is a flowchart of triggering a startup operation according to an embodiment of this disclosure. First, the terminal plays a game video corresponding to the cloud game application. When the game video is played to a screen frame shown in FIG. 8(a), the user touches and holds a playing interface of the game video to trigger the terminal to receive the fourth operation. In response to receiving the fourth operation, the terminal compares the fourth operation with the preset startup operation. When the fourth operation matches with the preset startup operation, e.g., the fourth operation and the preset startup operation are both touch and hold operations, and a holding duration corresponding to the fourth operation is equal to or greater than a pressing duration of the preset startup operation, the terminal determines that the startup operation performed on the cloud game application is received, and starts and runs the cloud game application. When the fourth operation does not match with the preset startup operation, e.g., the preset startup operation is a double-click operation and the fourth operation is a touch and hold operation, the terminal continues to play the game video corresponding to the cloud game application. In an example, when the fourth operation does not match with the preset startup operation, the terminal may display startup mode prompt information to prompt the user of an effective mode of starting the cloud game application.

In the embodiments of this disclosure, for the convenience of description, various ways of triggering the startup operation are described respectively. In practical applications, cloud game applications can also be developed by combining a variety of ways of triggering the startup operation, so as to provide more options for the user to choose and improve the flexibility of triggering the startup operation. It is to be understood that these all fall within the protection scope of this disclosure.

Based on the above, in the technical solutions provided in the embodiments of this disclosure, a variety of ways to trigger the startup operation are provided to meet the diversified and personalized operation requirements of the user, thereby providing more options for the user to choose and improving the flexibility of triggering the startup operation. In addition, in the embodiments of this disclosure, the game video is started through the game control operation received by the cloud game application indicated in the game video, thereby meeting the need of the user to operate the cloud game application generated during the user's viewing of the game video in an effective and timely manner. In addition, in the embodiments of this disclosure, by displaying the startup control of the cloud game application after receiving the user's operation, the manner of starting the cloud game application can be prominently prompted to the user. In addition, in the embodiments of this disclosure, the cloud game application is started when an operation matching with the predefined startup operation is received, so as to effectively prevent accidental touches by the user. Because the predefined startup operation can also be defined by the user, the user's personalized needs can be fully met.

The starting and running of the cloud game application and displaying the initial display interface of the cloud game application by the terminal will be described below.

In an example, step 420 includes: determining a game progress corresponding to the game screen content displayed in the screen frame of the game video, in response to the startup operation performed on the cloud game application; and starting and running the cloud game application starting from the game progress, and display the display interface of the cloud game application.

In the embodiments of this disclosure, a game screen content displayed by the cloud game application in an initial display interface matches with a game screen content displayed in a screen frame of the game video at a moment of receiving the startup operation. That is, the game progress at the moment of starting the cloud game application is coherent with the game progress displayed in the game video at the moment the startup operation is received. Based on this, in response to the startup operation performed on the cloud game application, the terminal needs to first determine the game progress corresponding to the game screen content displayed in the screen frame of the game video, then start and run the cloud game application by using the game progress as a starting point (that is, starting from the game progress), and display the display interface of the cloud game application.

For the description of the step of "determining the game progress corresponding to the game screen content displayed in the screen frame of the game video" in this example, reference can be made to the description of the process of determining the "game progress node corresponding to the first timestamp" in the following embodiments. For the description of the step of "starting and running the cloud game application by using the game progress as a starting point, and displaying the display interface of the cloud game application" in this example, reference can be made to the descriptions of "starting and running the cloud game application starting from the game progress node corresponding to the first timestamp, and displaying the display interface of the cloud game application", and the details will not be repeated here.

In another example, step 420 includes the following sub-steps.

In a first sub-step, a first timestamp is determined.

The first timestamp is a timestamp corresponding to the screen frame of the game video at the moment of receiving the startup operation performed on the cloud game application. When determining that the startup operation is received, the terminal may determine the first timestamp. It takes a certain processing time for the terminal to determine whether the startup operation is received. Therefore, there may be a certain delay between the timestamp corresponding to the screen frame of the game video when the user inputs a trigger operation to trigger the terminal to determine whether the startup operation of the cloud game application is received (third timestamp) and the timestamp corresponding to the screen frame of the game video when the terminal determines that the startup operation is received (first timestamp). The delay is greater than or equal to the processing time of the terminal. In the embodiments of this disclosure, the terminal determines the timestamp corresponding to the screen frame of the game video at the moment the startup operation is received. However, in practical applications, because the processing time of the terminal may be short and can be ignored, it may be considered that the timestamp corresponding to the screen frame of the game video at the moment the startup operation is received may be the same as the timestamp corresponding to the screen frame of the game video when the user inputs a trigger operation to trigger the terminal to determine whether the startup operation is received.

In a second sub-step, the cloud game application is started and run starting from a game progress node corresponding to the first timestamp, and the display interface of the cloud game application is displayed.

The first timestamp is determined, that is, the game progress of the cloud game application after startup is determined. In the embodiments of this disclosure, the terminal starts and runs the cloud game application starting from the game progress node corresponding to the first timestamp, and displays the display interface of the cloud game application. Then, the user can operate the cloud game application starting from the game progress node corresponding to the first timestamp. That is, in the embodiments of this disclosure, for the game video corresponding to the cloud game application, the game progress node before the first timestamp is operated by the user A recording the game video, and the game progress node after the first timestamp is operated by the user B watching the game video. In an example, the game progress node corresponding to the first timestamp may be operated by the user A or the user B, which is not limited in the embodiments of this disclosure.

It is to be understood that the user A who records the game video and the user B who watches the game video can be the same user. That is to say, when a user is watching a game video recorded by himself or herself, the user starts the cloud game application and continues to operate the game progress node after the cloud game application is started. The game progress node before the cloud game application is started is also operated by the user. The user A who records the game video and the user B who watches the game video can also be different users. That is to say, when a user is watching a game video recorded by another user, the user starts the cloud game application and continues to operate the game progress node after the cloud game application is started. The game progress node before the cloud game application is started is operated by the another user.

In an example, before the second sub-step of step 420, the method further includes: obtaining a cloud game archive associated with game videos; and determining a game progress node corresponding to the first timestamp.

In the embodiments of this disclosure, in order to quickly start the cloud game application while watching the game video, the game video corresponding to the cloud game application is associated with the cloud game archive corresponding to the cloud game application, so that subsequently the terminal can quickly obtain the cloud game archive. For other descriptions of the process of associating the game video with the cloud game archive, reference can be made to the following embodiments, and the details will not be repeated here.

The cloud game archive is an archive used to record game data and timestamps involved during the operation of the cloud game application by the user. In the embodiments of this disclosure, the cloud game archive includes archive data of at least one game progress node, and the archive data includes a timestamp corresponding to the game progress node. Because the cloud game archive includes the timestamp corresponding to the at least one game progress node, the terminal, after determining the first timestamp, can obtain the game progress node corresponding to the first timestamp from the cloud game archive. Archive data of the game progress node corresponding to the first timestamp includes the first timestamp.

In an example, the archive data of the game progress node includes not only the timestamp corresponding to the game progress node, but also game data corresponding to the game progress node. The game data refers to data involved during the game progress of the cloud game application. For example, the game data includes one or more of operation data, path data of virtual objects controlled by users, and data of virtual resources (such as virtual costumes, virtual items, etc.) owned by virtual objects controlled by users. Based on this, the second sub-step of step 420 includes: obtaining game data corresponding to the first timestamp; loading the cloud game application according to the game data corresponding to the first timestamp; and displaying the initial display interface of the cloud game application. The game data corresponding to the first timestamp is game data corresponding to the game progress node corresponding to the first timestamp, and archive data of the game progress node corresponding to the first timestamp includes the game data corresponding to the game progress node corresponding to the first timestamp. When starting and running the cloud game application, the terminal loads the cloud game application according to certain data. In the embodiments of this disclosure, the terminal loads the cloud game application based on the game data corresponding to the timestamp corresponding to the screen frame of the game video at the moment the startup operation is received, and displays the initial display interface of the cloud game application, so as to ensure that the game screen content displayed on the initial display interface of the cloud game application is consistent with the game screen content displayed in the screen frame of the game video at the moment the startup operation is received.

Based on the above, according to the technical solutions provided in the embodiments of this disclosure, the timestamp corresponding to the screen frame of the game video at the moment the startup operation is received is determined, and the cloud game application is started starting from the game progress node corresponding to the timestamp, to ensure that the game progress after the cloud game application is started is the game progress that the user reaches when watching the game video, thereby achieving a "you can play what you see" effect. In addition, in the embodiments of this disclosure, the cloud game archive associated with the game video corresponding to the cloud game application is obtained, the game data of the game progress node is obtained from the cloud game archive, and the cloud game application is loaded according to the game data, providing sufficient technical support for "you can play what you see".

Figure 9:
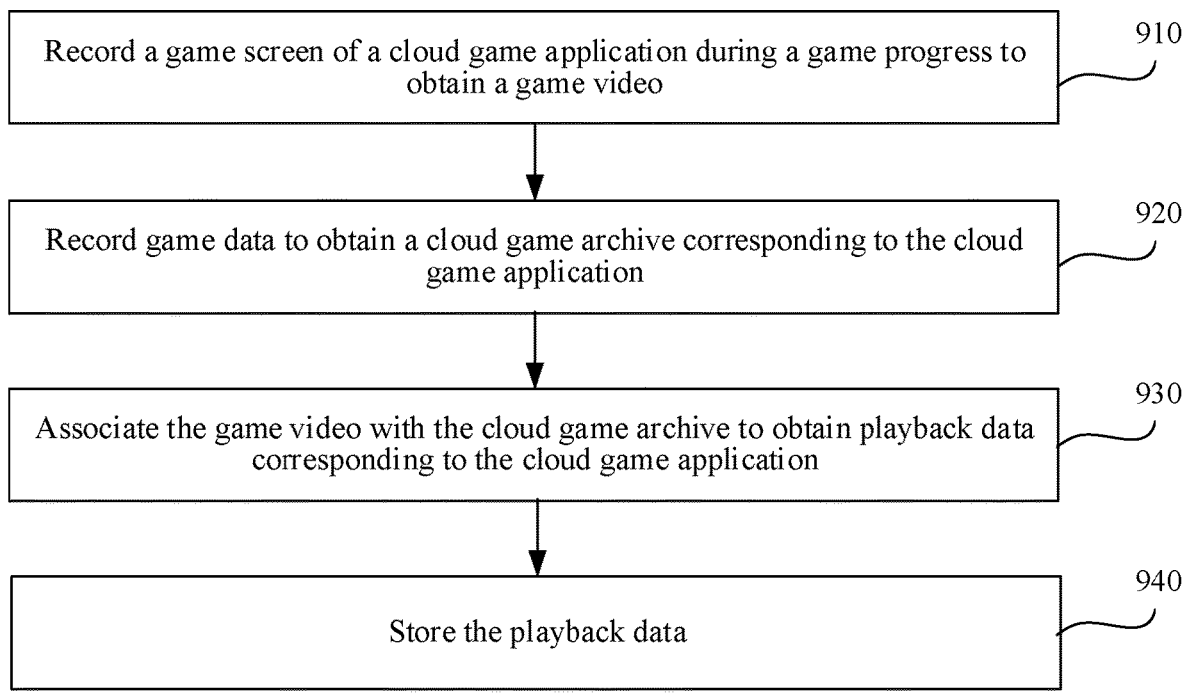
FIG. 9 is a flowchart of a method for application archiving according to an embodiment of this disclosure.

FIG. 9 is a flowchart of a method for application archiving according to an embodiment of this disclosure. The method can be applied to a terminal, such as the first terminal 10 and the second terminal 20 in the cloud game management system shown in FIG. 1 above. The method may include the following steps (steps 910-940):

In step 910, a game screen of a cloud game application is recorded during a game progress to obtain a game video.

When the user operates the cloud game application, the terminal can record the game screen of the cloud game application during the game progress, to obtain a game video corresponding to the cloud game application. In this embodiments of this disclosure, the terminal may obtain the game screen during the game progress at intervals of a preset time, and the obtained game screen is in the form of individual screen frames, so the game video recorded by the terminal includes at least one of screen frames obtained. In an example, each screen frame has a corresponding timestamp, so as to facilitate the subsequent association of the game video corresponding to the cloud game application with the cloud game archive corresponding to the cloud game application.

In step 920, game data is recorded to obtain a cloud game archive corresponding to the cloud game application.

In the process of the user operating the cloud game application, on the one hand, the terminal records the game screen during the game progress to obtain the game video; on the other hand, the terminal records the game data to obtain the cloud game archive. The game data refers to data involved during the game progress. For example, the game data includes one or more of operation data, path data of virtual objects controlled by users, and data of virtual resources (such as virtual costumes, virtual items, etc.) owned by virtual objects controlled by users.

In an example, step 920 includes: obtaining game data corresponding to at least one game progress node during the game progress; and generating archive data of the at least one game progress node to obtain the cloud game archive.

The game progress nodes are used to divide the game progress of the cloud game application. The division into the game progress nodes facilitates the storage, classification, calling, and obtaining of the game data involved during the game progress. The method of division into game progress nodes is not limited in the embodiments of this disclosure. In an example, one game progress node is defined at intervals of a preset time. For example, one game progress node is defined every 0.5 seconds. Alternatively, game progress nodes are defined according to user operations. For example, each time an operation from a user is received, one game progress node is defined. Alternatively, game progress nodes are defined according to a path of a virtual object controlled by the user. For example, each time the path of the virtual object changes, one game progress node is defined. Alternatively, game progress nodes may be defined using a combination of multiple methods. For example, on the basis of defining one game progress node every 0.5 seconds, if an operation from a user is received during the interval, a corresponding game progress node is also defined according to the operation from the user.

In the embodiments of this disclosure, the game progress node may be obtained after all game data during the game progress is obtained, or the game progress node may be determined in real time according to the game data obtained in real time during the game progress. After the game progress node is defined, the game data of the game progress node can be obtained, and the archive data of the game progress node can be generated. The archive data of the game progress node includes the timestamp and the game data that correspond to the game progress node. In an example, the archive data of the game progress node is generated in real time in the process of obtaining the game data of the game progress node. For example, each time a game progress node is defined, game data of the game progress node is obtained, and archive data of the game progress node is generated. Alternatively, the archive data of the game progress node is generated after the game data of all the game progress nodes is obtained. The method of generating the archive data of the game progress node is not limited in the embodiments of this disclosure.

After the archive data of the at least one game progress node is generated, the cloud game archive can be obtained, that is, the cloud game archive includes the archive data of the at least one game progress node. Since the archive data of each game progress node includes a timestamp and game data that correspond to the game node, there is also a correspondence between the timestamp and the game data in the embodiments of this disclosure, and the corresponding game data can be located based on the timestamp. In an example, game data corresponding to a target timestamp includes operation data corresponding to the target timestamp, the operation data corresponding to the target timestamp being used for indicating a game control operation received at the target timestamp. For the descriptions of the operation data and the game control operation, reference can be made to the above embodiments, and the details will not be repeated here.

In step 930, the game video is associated with the cloud game archive to obtain playback data corresponding to the cloud game application.

In the embodiments of this disclosure, the game video and the cloud game archive corresponding to the cloud game application may be generated synchronously, that is, step 910 and step 920 are performed simultaneously. Alternatively, the game video and the cloud game archive corresponding to the cloud game application are not generated synchronously. For example, during the game progress, on the one hand, the game screen is recorded to obtain the game video, and on the other hand, the game data is recorded. After the game progress, the cloud game archive is generated according to the recorded game data.

After the game data and the cloud game archive are obtained respectively, an association relationship between the game video and the cloud game archive can be established to associate the game video with the cloud game archive, to obtain the playback data corresponding to the cloud game application. In an example, in the embodiments of this disclosure, the game video is associated with the cloud game archive based on the timestamp. Each screen frame of the game video has a corresponding timestamp. The cloud game archive also includes the timestamp and the game data corresponding to each game progress node. The game data can be associated with the game video based on the timestamp.

Figure 10:
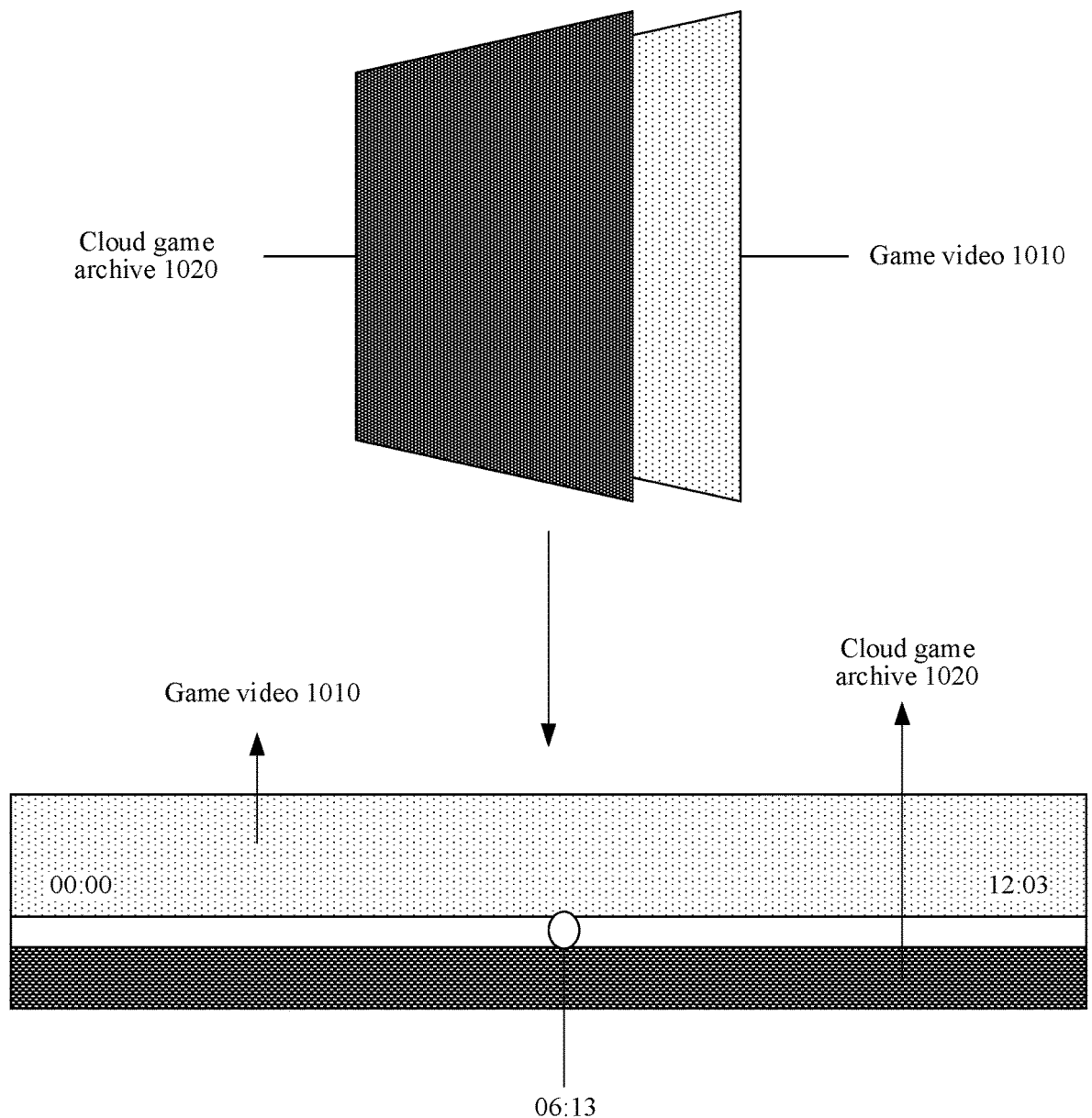
FIG. 10 is a schematic diagram of a method for application archiving according to an embodiment of this disclosure.

For example, as shown in FIG. 10, there is an association relationship between a game video 1010 and a cloud game archive 1020. According to a timestamp (e.g., 06:13) of a game progress node included in the cloud game archive 1020, a screen frame corresponding to the timestamp (e.g., 06:13) in the game video 1010 can be located. Game data corresponding to the timestamp (e.g., 06:13) is associated with the game video 1010. For example, the game data corresponding to the timestamp (e.g., 06:13) is associated with the screen frame corresponding to the timestamp (e.g., 06:13) in the game video 1010.

Because the way of obtaining the screen frame may be inconsistent with the way of defining the game progress nodes, the timestamp of a certain game progress node may not accurately correspond to a screen frame in the game video. For example, the timestamp of the game progress node includes 08:00, while the timestamps corresponding to the screen frame of the game video do not include 08:00, but include 07:59 and 08:01. In this case, the game data corresponding to this timestamp may be associated with the game video through a timestamp closest to this timestamp. For example, the timestamp of the game progress node includes 08:00, but the timestamps corresponding to the screen frame of the game video include 07:58 and 08:01. In this case, the game data corresponding to the timestamp 08:00 can be associated with the game video through the timestamp 08:01.

If there are multiple timestamps that are closest to the timestamp of the game progress node among the timestamps corresponding to the screen frame of the game video, the game data of the game progress node may be associated with the game video through the timestamp before the game progress node or may be associated with the game video through the timestamp after the game progress node, which is not limited in the embodiments of this disclosure. For example, the timestamp of the game progress node includes 08:00, but the timestamps corresponding to the screen frame of the game video include 07:59 and 08:01. In this case, not only the game data corresponding to the timestamp 08:00 can be associated with the game video through the timestamp 08:01, but also the game data corresponding to the timestamp 08:00 can be associated with the game video through the timestamp 07:59.

In step 940, the playback data is stored.

After the playback data corresponding to the cloud game application is generated according to the game video and the cloud game archive, the playback data can be stored for subsequent calling or retrieval. In an example, the terminal may also upload the playback data to a server, so as to reduce the storage burden of the terminal and facilitate other terminals in calling the playback data. For example, when the playback data is generated by the client of the cloud game application, the terminal uploads the playback data to a server of the cloud game application. When the playback data is generated by another application (such as a live streaming application, a social application, a video playback application, etc.), the terminal uploads the playback data to a server of the another application.

The embodiments of this disclosure are described using the example where the playback data is generated by a terminal. In practical applications, the playback data may also be generated by a server. For example, a terminal uploads a recorded game video and a recorded cloud game archive to a server, and then the server associates the game video with the cloud game archive to obtain playback data. Alternatively, a terminal uploads a recorded game video and recorded game data to a server, and the server generates a cloud game archive according to the recorded game data, and associates the game video with the cloud game archive to obtain playback data. It is to be understood that these all fall within the protection scope of this disclosure.

Based on the above, according to the technical solutions provided in the embodiments of this disclosure, during a game progress of a cloud game application, a game screen during the game progress is recorded to obtain a game video, game data involved during the game progress is recorded to obtain a cloud game archive, and then the game video and the cloud game archive are associated to obtain playback data, thereby providing a method for archiving a cloud game application. In addition, the technical solutions provided in the embodiments of this disclosure ensure that subsequently when a terminal plays the game video, a game progress node in the cloud game archive can be determined in a timely and accurate manner according to a startup operation triggered by a user, so as to ensure that the startup of the cloud game application starting from the determined game progress node can be realized, thereby providing the underlying technical support for the application startup effect "you can play what you see", facilitating the implementation of the quick start of the cloud game application, and improving the startup and archiving mechanism of the cloud game application.

In the embodiments of this disclosure, a terminal to which the method for application startup and a terminal to which the method for application archiving may be the same or different terminals. For example, the method for application archiving is applied to the first terminal 10 in FIG. 1, and the method for application startup is applied to the second terminal 20 in FIG. 1. In the embodiments of this disclosure, a client to which the method for application startup and a client to which the method for application archiving may be the same or different clients. For example, the method for application startup is applied to a client of a live streaming application, and the method for application archiving is applied to a client of a cloud game application.

Figure 11:
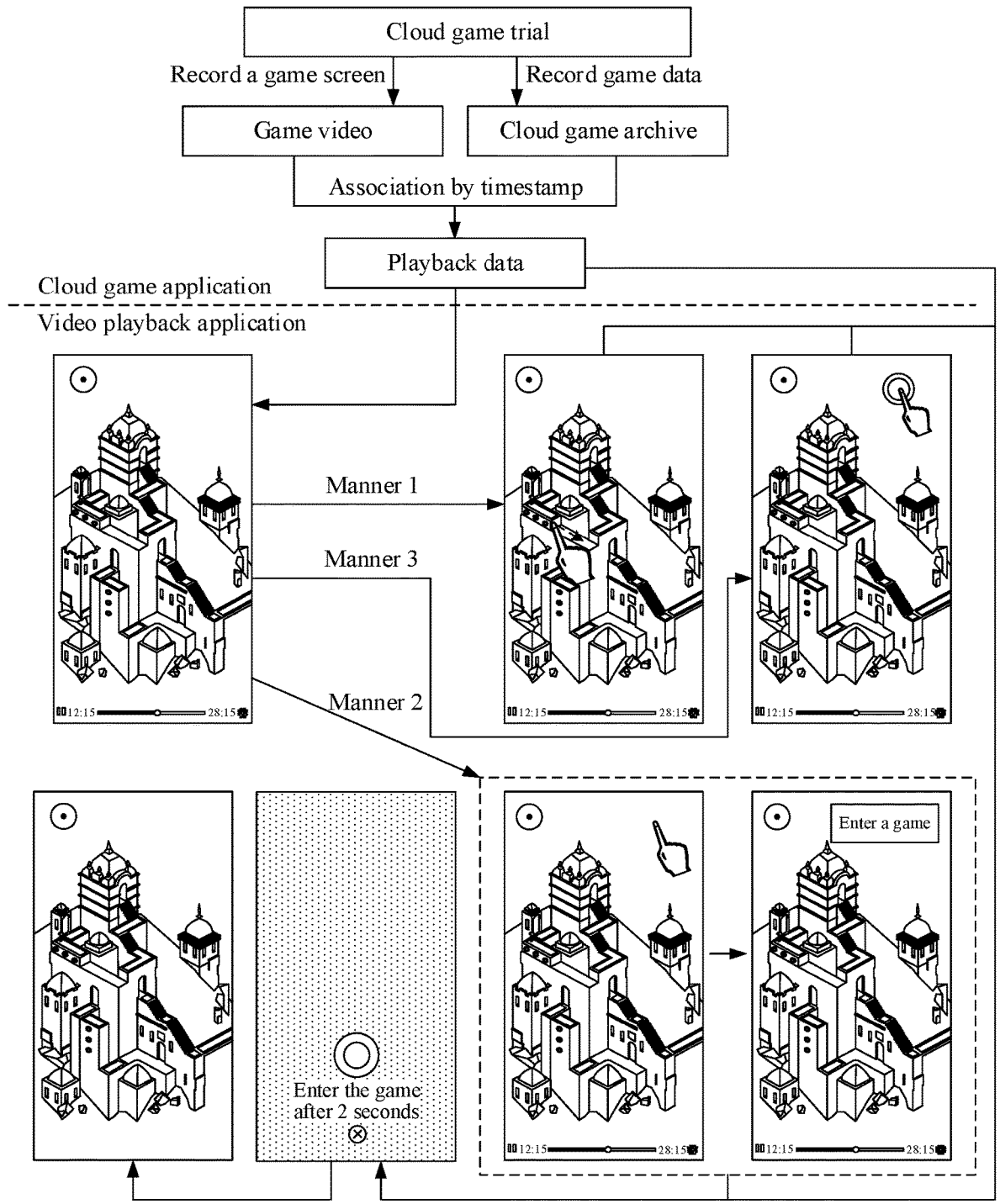
FIG. 11 is a schematic diagram of a method for application startup and archiving according to an embodiment of this disclosure.

The technical solutions of this disclosure will be described below using an example where the method for application startup is applied to a client of a video playback application and the method for application archiving is applied to a client of a cloud game application. FIG. 11 is a schematic diagram of a method for application startup and archiving according to an embodiment of this disclosure.

As shown in FIG. 11, when user A operates the cloud game application, a client of a cloud game application records a game screen of the cloud game application during a game progress to obtain a game video, and records game data to obtain a cloud game archive corresponding to the cloud game application. The game data refers to data involved during the game progress. For example, the game data includes one or more of operation data, path data of virtual objects controlled by users, and data of virtual resources (such as virtual costumes, virtual items, etc.) owned by virtual objects controlled by users.

After obtaining the game video and the cloud game archive respectively, the client of the cloud game application associates the cloud game archive with the game video through a timestamp, to obtain playback data corresponding to the cloud game application. Through the playback data, not only the game video can be played, but also a cloud game clip corresponding to the cloud game archive can be played.

As shown in FIG. 11, operated by user B, a client of a video playback application obtains the playback data from the client of the cloud game application, and plays the game video corresponding to the cloud game application. In an example, the client of the cloud game application can upload the playback data to a cloud game server; next, the cloud game server transmits the playback data to a server of the video playback application; then the server of the video playback application transmits the playback data to the client of the video playback application.

In the process of playing the game video, user B can operate the game video to trigger the client of the video playback application to receive a startup operation performed on the cloud game application. As shown in FIG. 11, three ways to start the cloud game application are provided in the embodiments of this disclosure.

Manner 1: The user B operates a game control operation in the cloud game application indicated by the game video to trigger the client of the video playback application to receive the startup operation.

Manner 2: The user B clicks the game video to trigger the client of the video playback application to display a startup control. Further, the user B triggers the startup control to trigger the client of the video playback application to receive the startup operation.

Manner 3: The user B touches and holds or double-clicks the game video to trigger the client of the video playback application to receive the startup operation.

As shown in FIG. 11, after receiving the startup operation, the client of the video playback application starts and runs the cloud game application. During the process of loading the cloud game application, a loading interface of the cloud game application may be displayed to buffer between the video playback application and the cloud game application. After the cloud game application is loaded, an initial display interface of the cloud game application is displayed. A game screen content displayed by the cloud game application in an initial display interface after startup matches with a game screen content displayed in a screen frame of the game video at a moment of receiving the startup operation.

The following is an apparatus embodiment of this disclosure, which can be used to perform the method embodiments of this disclosure. For details not disclosed in the apparatus embodiments of this disclosure, reference is made to the method embodiments of this disclosure. One or more modules, submodules, and/or units of the apparatus can be implemented by processing circuitry, software, or a combination thereof, for example.

Figure 12:
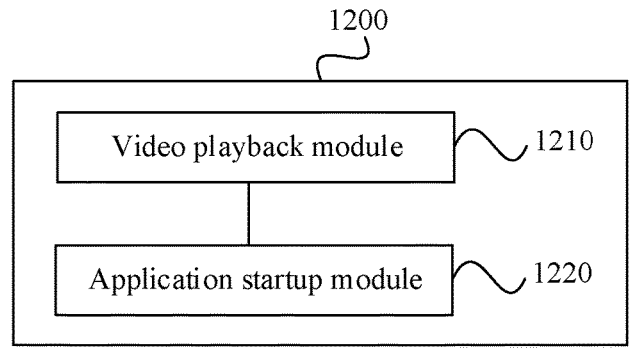
FIG. 12 is a block diagram of an apparatus for application startup according to an embodiment of this disclosure.

FIG. 12 is a block diagram of an apparatus for application startup according to an embodiment of this disclosure. The apparatus has a function of implementing the above example of the method for application startup, and the function may be implemented by hardware or by executing corresponding software by hardware. The apparatus may be a terminal, or may be disposed in a terminal. The apparatus 1200 may include: a video playback module 1210 and an application startup module 1220.

The video playing module 1210 is configured to play a game video corresponding to a cloud game application.

The application startup module 1220 is configured to start the cloud game application in response to a startup operation performed on the cloud game application, and display a display interface of the cloud game application, a game screen content displayed by the cloud game application in an initial display interface after startup matching with a game screen content displayed in a screen frame of the game video at a moment of receiving the startup operation.

In an example, the application startup module 1220 is configured to: determine a game progress corresponding to the game screen content displayed in the screen frame of the game video, in response to the startup operation; and start and run the cloud game application starting from the game progress, and display the display interface of the cloud game application.

Figure 13:
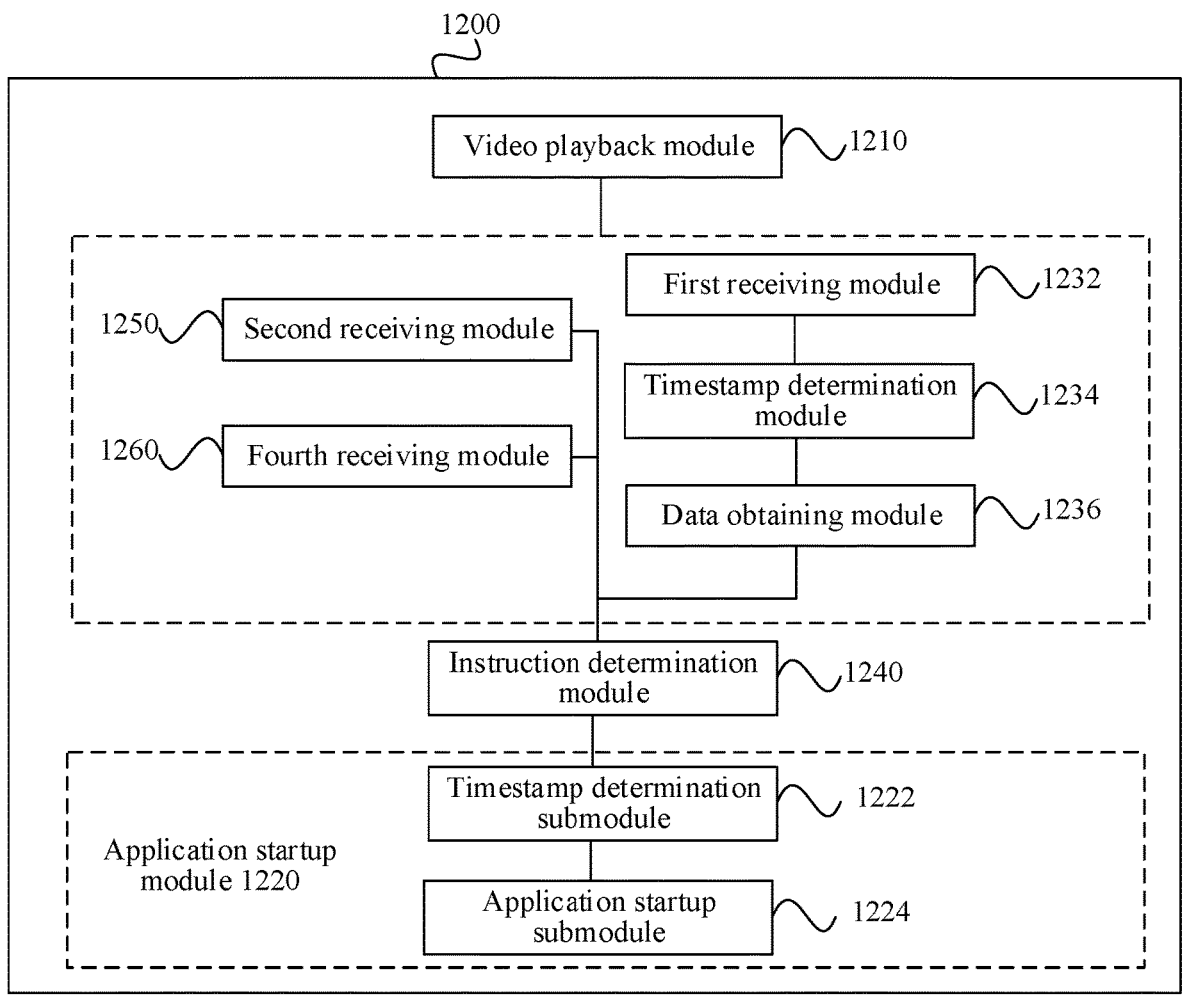
FIG. 13 is a block diagram of an apparatus for application startup according to another embodiment of this disclosure.

In an example, as shown in FIG. 13, the application startup module 1220 includes: a timestamp determination submodule 1222, configured to determine a first timestamp, the first timestamp being a timestamp corresponding to the screen frame of the game video at the moment of receiving the startup operation; and an application startup submodule 1224, configured to start and run the cloud game application starting from a game progress node corresponding to the first timestamp, and display the display interface of the cloud game application.

In an example, as shown in FIG. 13, the application startup submodule 1224 is further configured to: obtain a cloud game archive associated with the game video, the cloud game archive including archive data of at least one game progress node, and the archive data including a timestamp corresponding to the game progress node; and determine the game progress node corresponding to the first timestamp, archive data of the game progress node corresponding to the first timestamp including the first timestamp.

In an example, the archive data further includes game data corresponding to the game progress node, the game data being data involved during a game progress of the cloud game application; and as shown in FIG. 13, the application startup submodule 1224 is configured to: obtain game data corresponding to the first timestamp, the game data corresponding to the first timestamp being game data corresponding to the game progress node corresponding to the first timestamp, and archive data of the game progress node corresponding to the first timestamp including the game data corresponding to the game progress node corresponding to the first timestamp; load the cloud game application according to the game data corresponding to the first timestamp; and display the initial display interface of the cloud game application.

In an example, as shown in FIG. 13, the apparatus 1200 further includes: a first receiving module 1232, configured to receive a first operation performed on a playing interface of the game video; and an instruction determination module 1240, configured to determine that the startup operation is received, in response to the first operation matching with a game control operation, the game control operation being an operation received by the cloud game application indicated by the game video.

In an example, as shown in FIG. 13, the apparatus 1200 further includes: a timestamp determination module 1234, configured to determine a second timestamp, the second timestamp being a timestamp corresponding to the screen frame of the game video at the moment of receiving the first operation; and a data obtaining module 1236, configured to obtain game data corresponding to the second timestamp, the game data being data involved during a game progress of the cloud game application, the game data corresponding to the second timestamp including operation data corresponding to the second timestamp, the operation data corresponding to the second timestamp being used for indicating a game control operation received at the second timestamp, the game control operation being used for determining whether the startup operation is received.

In an example, as shown in FIG. 13, the apparatus 1200 further includes: a second receiving module 1250, configured to display a startup control of the cloud game application in response to a second operation performed on a playing interface of the game video; and an instruction determination module 1240, configured to determine that the startup operation is received, in response to a third operation performed on the startup control.

In an example, as shown in FIG. 13, the apparatus 1200 further includes: a fourth receiving module 1260, configured to receive a fourth operation performed on a playing interface of the game video; and an instruction determination module 1240, configured to determine that the startup operation is received, in response to the fourth operation matching with a preset startup operation, the preset startup operation being a preset operation for starting the cloud game application.

Based on the above, in the technical solutions provided by the embodiments of this disclosure, in a process of playing a game video corresponding to a cloud game application, a startup operation performed on the cloud game application is received. In response to the startup operation, the cloud game application is started and run. Whereby, the cloud game application can be started conveniently in the process of playing the game video, which not only simplifies the process of starting the cloud game application, but also improves the efficiency of starting the cloud game application. In addition, in the embodiments of this disclosure, the game screen content displayed by the cloud game application in the initial display interface after startup matches with the game screen content displayed in the screen frame of the game video at the moment of receiving the startup operation, thereby avoiding a deviation between the game progress of the cloud game application and the game progress shown in the game video, ensuring that the user operates the cloud game application from the starting point of the game that the user chooses or is interested in, and achieving a "you can play what you see" effect.

Figure 14:
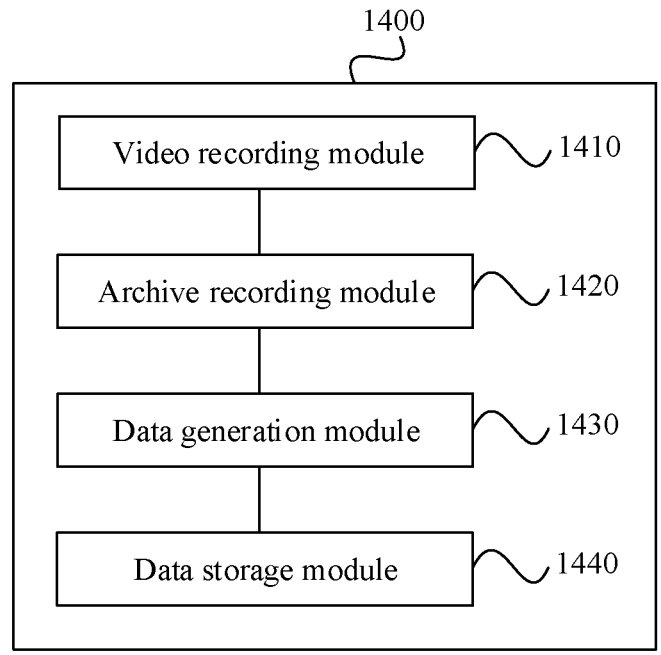
FIG. 14 is a block diagram of an apparatus for application archiving according to an embodiment of this disclosure.

FIG. 14 is a block diagram of an apparatus for application archiving according to an embodiment of this disclosure. The apparatus has a function of implementing the above example of the method for application archiving, and the function may be implemented by hardware or by executing corresponding software by hardware. The apparatus may be a terminal, or may be disposed in a terminal. The apparatus 1400 may include: a video recording module 1410, an archive recording module 1420, a data generation module 1430, and a data storage module 1440.

The video recording module 1410 is configured to record a game screen of a cloud game application during a game progress to obtain a game video.

The archive recording module 1420 is configured to record game data to obtain a cloud game archive corresponding to the cloud game application, the game data being data involved in the game progress.

The data generation module 1430 is configured to associate the game video with the cloud game archive to obtain playback data corresponding to the cloud game application.

The data storage module 1440 is configured to store the playback data.

In an example, the archive recording module 1420 is configured to: obtain game data corresponding to at least one game progress node during the game progress; and generate archive data of the at least one game progress node to obtain the cloud game archive, the archive data including a timestamp and game data that correspond to the game progress node.

In an example, game data corresponding to a target timestamp including operation data corresponding to the target timestamp, the operation data corresponding to the target timestamp being used for indicating a game control operation received at the target timestamp.

Based on the above, according to the technical solutions provided in the embodiments of this disclosure, during a game progress of a cloud game application, a game screen during the game progress is recorded to obtain a game video, game data involved during the game progress is recorded to obtain a cloud game archive, and then the game video and the cloud game archive are associated to obtain playback data, thereby providing a method for archiving a cloud game application. In addition, the technical solutions provided in the embodiments of this disclosure ensure that subsequently when a terminal plays the game video, a game progress node in the cloud game archive can be determined in a timely and accurate manner according to a startup operation triggered by a user, so as to ensure that the startup of the cloud game application starting from the determined game progress node can be realized, thereby providing the underlying technical support for the application startup effect "you can play what you see", facilitating the implementation of the quick start of the cloud game application, and improving the startup and archiving mechanism of the cloud game application.

When the apparatus provided in the foregoing embodiments implements functions of the apparatus, the division of the foregoing functional modules is merely an example for description. In the practical application, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same concept. For the specific implementation process, reference may be made to the method embodiments, and details are not described herein again.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 15:
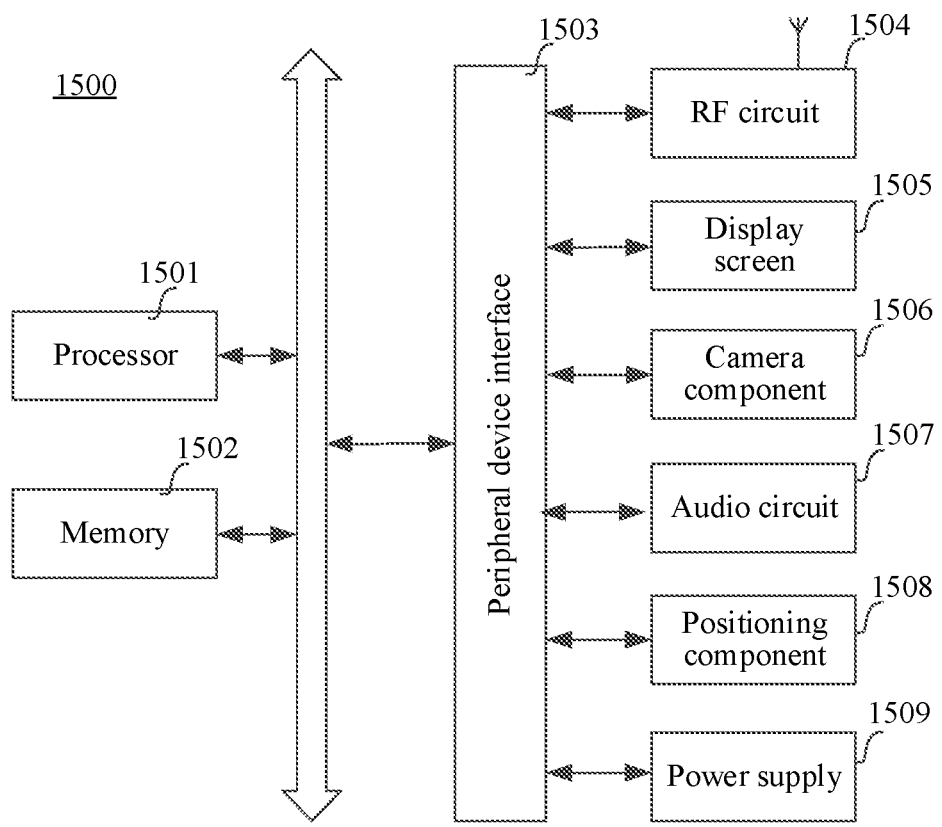
FIG. 15 is a structural block diagram of a terminal according to an embodiment of this disclosure.

FIG. 15 is a structural block diagram of a terminal 1500 according to an embodiment of this disclosure. The terminal 1500 may be an electronic device such as a mobile phone, a tablet computer, a multimedia playback device, a television, a projector, a display, a wearable device, a PC, or the like. The terminal may be configured to implement the method for application startup described in the above embodiments, or configured to implement the method for application archiving described in the above embodiments. To be specific, the terminal 1500 generally includes: a processor 1501 and a memory 1502.

Processing circuitry, such as the processor 1501, may include one or more processing cores, and may be, for example, a 4-core processor or an 8-core processor. The processor 1501 may be implemented by using at least one hardware form of a digital signal processor (DSP), a field-programmable gate array (FPGA), or a programmable logic array (PLA). The processor 1501 may also include a main processor and a coprocessor. The main processor is a processor configured to process data in an awake state, and is also referred to as a central processing unit (CPU). The coprocessor is a low power consumption processor configured to process data in a standby state. In some embodiments, a graphics processing unit (GPU) may be integrated into the processor 1501. The GPU is configured to be responsible for rendering and drawing content to be displayed on a display. In some embodiments, the processor 1501 may further include an artificial intelligence (AI) processor. The AI processor is configured to process a calculation operation related to machine learning.

The memory 1502 may include one or more computer-readable storage media that may be non-transitory. The memory 1502 may further include a high-speed random access memory and a non-transitory memory, for example, one or more magnetic disk storage devices or flash storage devices. In some embodiments, the non-transitory computer-readable storage medium in the memory 1502 is configured to store at least one instruction, at least one program, a code set, or an instruction set. The at least one instruction, the at least one program, the code set, or the instruction set is configured to be executed by one or more processors to implement the method for application startup or implement the method for application archiving.

In some embodiments, the terminal 1500 may further include: a peripheral device interface 1503 and at least one peripheral device. The processor 1501, the memory 1502, and the peripheral device interface 1503 may be connected by a bus or a signal line. Each peripheral device may be connected to the peripheral device interface 1503 by a bus, a signal line, or a circuit board. Specifically, the peripheral device includes: at least one of a radio frequency circuit 1504, a display screen 1505, a camera component 1506, an audio circuit 1507, a positioning component 1508, or a power supply 1509.

It will be appreciated by those skilled in the art that the structure shown in FIG. 15 is not limiting of the terminal 1500 and may include more or fewer components than illustrated, or some components may be combined, or different component arrangements may be employed.

In an exemplary embodiment, a computer-readable storage medium, such as a non-transitory computer-readable storage medium, is further provided, the storage medium storing at least one instruction, at least one program, a code set, or an instruction set, the at least one instruction, the at least one program, the code set, or the instruction set, when executed by a processor of a terminal, implementing the method for application startup or the method for application archiving.

In an example, the computer-readable storage medium may include. a ROM, a RAM, a solid state drive (SSD), an optical disc, or the like. The RAM may include a resistance random access memory (ReRAM) and a dynamic random access memory (DRAM).

In an exemplary embodiment, a computer program product or a computer program is further provided. The computer program product or the computer program includes computer instructions, and the computer instructions are stored in a computer-readable storage medium. A processor of a terminal reads the computer instructions from the computer-readable storage medium and executes the computer instructions, to cause the terminal to implement the method for application startup or the method for application archiving.

It is to be understood that "plurality of" mentioned in the specification means two or more. "And/or" describes an association relationship between associated objects and represents that three relationships may exist. For example, A and/or B may represent the following three cases: Only A exists, both A and B exist, and only B exists. The character "/" generally indicates an "or" relationship between the associated objects. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this disclosure.

It is to be further understood that, in this specification, "or" and "and" used for connecting two steps represent the same meaning, and are both used for expressing that the two steps need to be performed while an execution sequence of the two steps is not limited. For example, "perform step A, and perform step B" and "perform step A, or perform step B" are both used for expressing that "both step A and step B need to be performed", but an execution sequence of step A and step B is not limited. Step A may be performed before step B, or may be performed after step B, or may be performed with step B at the same time.

It is to be further understood that, in this specification, "if . . . , . . . " and "in a case of . . . , . . . " used for connecting two pieces of information express the same meaning, and are both used for expressing that a previous piece of information is a sufficient but not necessary condition of a next piece of information. For example, "if A, B" and "in a case of A, B" are both used for expressing "if A exists, B exists; but if B exists, A does not necessarily exist".

The foregoing descriptions are merely examples of the embodiments of this disclosure, but are not intended to limit this disclosure. Any modification, equivalent replacement, or improvement made without departing from the spirit and principle of this disclosure shall fall within the protection scope of this disclosure.

What is claimed is:

1. A method for starting an application, the method comprising:
    playing a video that includes game content of a game application in a play interface;
    receiving a user input operation applied on the play interface from a first user;
    determining whether the user input operation is a startup operation to start the game application during the playback of the video, the user input operation being determined as the startup operation when the user input operation matches a predefined condition, the predefined condition being that the user input operation applied on the play interface by the first user matches a game control operation being performed by a second user in a game session of the game application played back in the video;
    starting, by processing circuitry, the game application in response to the user input operation being determined as the startup operation when the user input operation matches the predefined condition; and
    displaying the game content of the started game application that is determined to match the game content of the video displayed when the startup operation is received from the first user, the game content of the started game application being determined based on when the startup operation is received from the first user during the playback of the video.

2. The method according to claim 1, wherein
    the game application is a cloud game application;
    the starting the game application includes sending a request to start the cloud game application to a server; and
    the method further includes receiving, from the server, the game content of the game application that is determined to match the game content of the video displayed when the startup operation is received.

3. The method according to claim 1, wherein a game progress of the game application that is started is synchronized with a game progress of the game application that is displayed in the video when the startup operation is received from the first user.

4. The method according to claim 1, wherein the starting the game application comprises:
    determining a first timestamp corresponding to the game content of the video that is displayed when the startup operation is received from the first user; and
    starting the game application from a game progress point that corresponds to the first timestamp.

5. The method according to claim 4, further comprising:
    obtaining a game archive associated with the video, the game archive including archive data of a plurality of game progress points, and the archive data including a timestamp corresponding to each of the plurality of game progress points; and
    determining a game progress point of the plurality of game progress points that corresponds to the first timestamp, the archive data of the game progress point including the first timestamp.

6. The method according to claim 5, wherein
    the archive data further includes game data corresponding to the game progress point, the game data including game state information of the game application that is associated with the first timestamp; and
    the starting comprises:
        obtaining the game data corresponding to the first timestamp; and
        causing the game application to start according to the game data corresponding to the first timestamp.

7. The method according to claim 1, wherein the determining comprises:
    determining that the user input operation is the startup operation in response to an operation time, an operation location, and an operation duration time of the user input operation applied on the play interface matching an operation time, an operation location, and an operation duration time of the game control operation being performed by the second user in the game session of the game application played back in the video.

8. The method according to claim 7, further comprising:
    determining a first timestamp, the first timestamp corresponding to the game content of the video that is displayed when the user input operation is received, and
    obtaining game data corresponding to the first timestamp, the game data including game state information of the game application that is associated with the first timestamp; and
    the game data corresponding to the first timestamp includes operation data that corresponds to the first timestamp, the operation data corresponding to the first timestamp identifying the game control operation.

9. The method according to claim 1, further comprising:
    displaying a startup control element of the game application in response to a first user input performed on a user interface of the game application that is displayed in the video; and
    determining that the startup operation is received in response to a second user input performed on the startup control element.

10. The method according to claim 1, further comprising:
    determining that the user input operation is the startup operation in response to receiving a predetermined user input.

11. An apparatus for application startup, comprising:
    processing circuitry configured to:
        play a video that includes game content of a game application in a play interface;
        receive a user input operation applied on the play interface from a first user;
        determine whether the user input operation is a startup operation to start the game application during the playback of the video, the user input operation being determined as the startup operation when the user input operation matches a predefined condition, the predefined condition being that the user input operation applied on the play interface by the first user matches a game control operation being performed by a second user in a game session of the game application played back in the video;
        start the game application in response to the user input operation being determined as the startup operation when the user input operation matches the predefined condition; and
        display the game content of the started game application that is determined to match the game content of the video displayed based on when the startup operation is received from the first user, the game content of the started game application being determined based on when the startup operation is received from the first user during the playback of the video.

12. The apparatus according to claim 11, wherein the game application is a cloud game application; and the processing circuitry is configured to:
    send a request to start the cloud game application to a server; and
    receive, from the server, the game content of the game application that is determined to match the game content of the video displayed when the startup operation is received.

13. The apparatus according to claim 11, wherein a game progress of the game application that is started is synchronized with a game progress of the game application that is displayed in the video when the startup operation is received from the first user.

14. The apparatus according to claim 11, wherein the processing circuitry is configured to:
    determine that the user input operation is the startup operation in response to an operation time, an operation location, and an operation duration time of the user input operation matching an operation time, an operation location, and an operation duration time of the game control operation being performed by the second user in the game session of the game application played back in the video.

15. The apparatus according to claim 11, wherein the processing circuitry is configured to:
    display a startup control element of the game application in response to a first user input performed on a user interface of the game application that is displayed in the video; and
    determine that the startup operation is received in response to a second user input performed on the startup control element.

16. The apparatus according to claim 11, wherein the processing circuitry is configured to:
    determine that the user input operation is the startup operation in response to receiving a predetermined user input.

17. A non-transitory computer-readable storage medium storing instructions which when executed by a processor cause the processor to perform:
    playing a video that includes game content of a game application in a play interface;
    receiving a user input operation applied on the play interface from a first user;
    determining whether the user input operation is a startup operation to start the game application during the playback of the video, the user input operation being determined as the startup operation when the user input operation matches a predefined condition, the predefined condition being that the user input operation applied on the play interface by the first user matches a game control operation being performed by a second user in a game session of the game application played back in the video;
    starting the game application in response to the user input operation being determined as the startup operation when the user input operation matches the predefined condition; and
    displaying the game content of the started game application that is determined to match the game content of the video displayed when the startup operation is received from the user, the game content of the started game application being determined based on when the startup operation is received from the user during the playback of the video.

* * * * *